United States Patent
Haneji et al.

(10) Patent No.: US 10,517,043 B2
(45) Date of Patent: Dec. 24, 2019

(54) MOBILE TELEPHONE, APPARATUS, METHOD AND COMPUTER IMPLEMENTABLE INSTRUCTIONS PRODUCT

(71) Applicant: NEC Corporation, Tokyo (JP)

(72) Inventors: Hayato Haneji, Berkshire (GB); Iskren Ianev, Berkshire (GB); Yannick Lair, Berkshire (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/656,663

(22) Filed: Jul. 21, 2017

(65) Prior Publication Data
US 2017/0325163 A1 Nov. 9, 2017

Related U.S. Application Data

(62) Division of application No. 14/787,709, filed as application No. PCT/JP2014/063132 on May 9, 2014.

(30) Foreign Application Priority Data

May 13, 2013 (GB) .................................. 1308572.5

(51) Int. Cl.
*H04W 52/02* (2009.01)
*H04W 74/00* (2009.01)
(Continued)

(52) U.S. Cl.
CPC ... *H04W 52/0212* (2013.01); *H04W 52/0216* (2013.01); *H04W 52/0229* (2013.01);
(Continued)

(58) Field of Classification Search
None
See application file for complete search history.

(56) References Cited

U.S. PATENT DOCUMENTS

| | | | |
|---|---|---|---|
| 2006/0281436 A1* | 12/2006 | Kim | H04W 36/24 455/343.2 |
| 2008/0043656 A1* | 2/2008 | Yoon | G06F 1/3209 370/311 |

(Continued)

FOREIGN PATENT DOCUMENTS

| | | |
|---|---|---|
| EP | 2400799 A2 | 12/2011 |
| EP | 2677817 A1 | 12/2013 |

(Continued)

OTHER PUBLICATIONS

Notification of Reasons for Refusal issued by the Japan Patent Office for Japanese Application No. 2015-556282 dated Jun. 26, 2018 (6 pages).

(Continued)

*Primary Examiner* — Eunsook Choi
(74) *Attorney, Agent, or Firm* — Wilmer Cutler Pickering Hale and Dorr LLP

(57) ABSTRACT

A communication system (100) is disclosed which uses system frames of a first and a second type. In a system frame of the first type communication with a mobile telephone (3) is subject to a restriction and in a system frame of the second type communication with said mobile telephone (3) is not subject to said restriction. It is determined whether or not to communicate with said mobile telephone (3), in a current system frame, in dependence on whether the current system frame is a first type of system frame or a second type of system frame.

17 Claims, 18 Drawing Sheets

(51) Int. Cl.
*H04W 76/28* (2018.01)
*H04W 68/02* (2009.01)
*H04W 88/06* (2009.01)

(52) U.S. Cl.
CPC ......... *H04W 74/006* (2013.01); *H04W 76/28* (2018.02); *H04W 68/025* (2013.01); *H04W 88/06* (2013.01); *Y02D 70/1222* (2018.01); *Y02D 70/1226* (2018.01); *Y02D 70/1262* (2018.01); *Y02D 70/1264* (2018.01); *Y02D 70/24* (2018.01); *Y02D 70/25* (2018.01)

(56) References Cited

U.S. PATENT DOCUMENTS

| | | | |
|---|---|---|---|
| 2009/0305711 A1* | 12/2009 | Rinne | H04L 47/822 455/450 |
| 2011/0130100 A1* | 6/2011 | Chen | H04W 24/00 455/67.11 |
| 2012/0300685 A1* | 11/2012 | Kim | H04W 68/02 370/311 |
| 2013/0288720 A1 | 10/2013 | Takano | |
| 2014/0153467 A1* | 6/2014 | Di Girolamo | H04W 68/025 370/311 |
| 2014/0254538 A1* | 9/2014 | Park | H04L 1/0026 370/329 |
| 2016/0057701 A1* | 2/2016 | Choi | H04W 76/28 370/311 |
| 2016/0081136 A1* | 3/2016 | Karampatsis | H04W 60/04 370/329 |
| 2016/0157250 A1* | 6/2016 | Chen | H04W 68/005 370/329 |
| 2016/0192433 A1* | 6/2016 | Deenoo | H04W 72/046 370/329 |

FOREIGN PATENT DOCUMENTS

| | | |
|---|---|---|
| JP | 2012-23770 A | 2/2012 |
| JP | 2012-509649 A | 4/2012 |
| JP | 2012-169970 A | 9/2012 |
| WO | WO-2011/136266 A1 | 11/2011 |
| WO | WO-2012/135514 A1 | 10/2012 |
| WO | WO-2012/137294 A1 | 10/2012 |

OTHER PUBLICATIONS

3GPP TR 23.887 v0.9.0, Technical Report, "3rd Generation Partnership Project; Technical Specification Group Services and System Aspects; Machine-Type and Other Mobile Data Applications Communications Enhancements (Release 12)," Apr. 2013, 121 pp.
3GPP TS 25.331 v11.50, Technical Specification, "3rd Generation Partnership Project; Technical Specification Group Radio Access Network; Radio Resource Control (RRC); Protocol Specification (Release 11)," Mar. 2013, 2079 pp.
3GPP TS 36.331 v11.3.0, Technical Specification, "3rd Generation Partnership Project; Technical Specification Group Radio Access Network; Evolved Universal Terrestrial Radio Access (E-UTRA); Radio Resource Control (RRC); Protocol Specification, (Release 11)," Mar. 2011, 344 pp.
3GPP TSG RAN WG2 Meeting No. 82, R2-131935, InterDigital, "Supporting Extended DRX in RCC_IDLE mode," Fukuoaka, Japan May 20-24, 2013, 5 pp.
International Search Report issued by the Japan Patent Office as International Searching Authority corresponding to PCT/JP2014/063132, dated Aug. 12, 2014, 2 pp.
United Kingdom Intellectual Property Office Search Report, corresponding to GB1308572.5, dated Nov. 15, 2013, 3 pp.
Japanese Decision to Grant a Patent issued in Japanese Patent Application No. 2015-556282, dated Aug. 20, 2019, 5 pages.

* cited by examiner

MOBILE TELEPHONE, APPARATUS, METHOD AND COMPUTER IMPLEMENTABLE INSTRUCTIONS PRODUCT

CROSS-REFERENCE TO RELATED APPLICATIONS

This application is a divisional of application Ser. No. 14/787,709 filed Oct. 28, 2015, entitled "Mobile Telephone, Apparatus, Method and Computer Implementable Instructions Product," which is a national stage application of International Application No. PCT/JP2014/063132, entitled "Mobile Telephone, Apparatus, Method and Computer Implementable Instructions Product," filed on May 9, 2014, which claims the benefit of priority from Great Britain Patent Application No. 1308572.5, filed on May 13, 2013. The disclosures of each of the aforementioned applications are incorporated herein by reference for all purposes.

TECHNICAL FIELD

The present invention relates to a communication system and to components thereof for transmitting paging messages to mobile or fixed communication devices. The invention has particular, but not exclusive, relevance to paging user equipment employing discontinuous reception in Long Term Evolution (LTE) Advanced systems as currently defined in associated 3rd Generation Partnership Project (3GPP) standards documentation.

BACKGROUND ART

In communication systems operating according to the LTE Advanced standards, a radio access network (RAN) provides User Equipment (UE), such as mobile telephones, access to a core network (and hence to other user equipment or other network nodes) via one or more of its cells. A radio access network typically comprises a plurality of base stations (eNB), each of which operates one or more cells of that RAN. Communication between the mobile telephones and the radio access network is controlled using a Radio Resource Control (RRC) protocol as defined in 3GPP TS 25.331 for UTRAN and TS36.331 for E-UTRAN. RRC handles the control plane signalling of Layer 3 between mobile telephones and the radio access network, and includes, inter alia, functions for broadcasting system information, paging, connection establishment and release, radio bearer establishment, reconfiguration and release, mobility procedures, and power control.

At any given time, mobile telephones may operate either in an 'RRC idle mode' or an 'RRC connected mode', the latter of which includes a 'CELL_PCH' (Cell Paging channel) and a 'URA_PCH' (URA Paging channel) modes, a 'CELL_FACH' (Forward access channel) mode, and a 'CELL_DCH' (Dedicated Channel) mode for the UTRAN access.

The radio access network controls the transition between the various operating modes for each mobile telephone within the cells of its base stations. Since the setting up and termination of an RRC connection between a base station of the RAN and the mobile telephone requires exchanging of signalling messages and hence utilises valuable system resources, and also takes some time to complete, the transition from connected to idle mode is only allowed under specific circumstances as defined in the 3GPP TS 25.331 for UTRAN and TS36.331 for E-UTRAN standards, the contents of which are incorporated herein by reference. For example, the serving base station (eNodeB/eNB for E-UTRAN and NodeB for UTRAN) might instruct a mobile telephone to enter the RRC idle mode only after it has confirmed that there is no more data to be transmitted to/from the particular mobile telephone (e.g. both uplink and downlink buffers are empty).

In particular, RRC protocol provides inactivity timers to control transitions to lower energy consuming states (i.e. when no data is transmitted within a certain time period), thereby preserving battery life of the mobile telephones whenever possible whilst also ensuring that the transition to idle mode does not happen too soon. In UTRAN for example, a so-called 'T1' timer controls the mobile telephone's transition from DCH to FACH mode, a 'T2' timer controls transition from FACH to PCH mode, and a 'T3' timer controls transition from PCH to idle mode. Different inactivity timer values can be set and broadcast by the radio access network, which result in different overall energy consumption of the mobile telephones (both active and idle) served by the base stations of that RAN.

For mobile telephones operating in the RRC connected mode, the RAN (e.g. a base station in case of GSM EDGE RAN (GERAN), a Radio Network Controller (RNC) in case of UTRAN, or an eNB in case of E-UTRAN) may optimise power consumption by configuring a so-called Discontinuous Reception (DRX) and/or Discontinuous Transmission (DTX) operation. Both techniques are based on reducing the mobile telephone's transceiver duty cycle while in active operation.

In DRX mode, the RAN sets a cycle during which the mobile telephone is operational for a certain period of time and the RAN transmits all scheduling and paging information (for this mobile telephone) during this period only. The mobile telephone can thus turn off its transceiver for the rest of the DRX cycle. DRX also applies to the RRC idle mode with a longer cycle time than in connected mode.

In DTX mode, the mobile telephone does not turn off its transceiver completely, but keeps monitoring the Physical Downlink Control Channel (PDCCH) to be able to receive data from the base station without undue delay.

The longer the 'off' duration relative to the duty cycle, the more power saving can be achieved.

A so-called System Frame (SF) is the largest time interval within the frame structure of UTRAN and E-UTRAN which can be used for synchronization between the RAN and the mobile telephone. Each radio frame within the SF is associated with a 'relative' frame number from #0 to #n−1 (where 'n' is the number of frames in the SF). This radio frame number (or frame index) is also referred to as System Frame Number (SFN). In E-UTRAN and UTRAN networks, a DRX cycle can be scheduled based on the SFN of the UTRAN Paging Indication Channel (PICH) or the E-UTRAN Physical Downlink Control Channel (PDCCH).

In the current 3GPP specifications the maximum length of the DRX cycle is less than the length of the SF, as it is limited to 5.12 s and 2.56 s for UTRAN and E-UTRAN, respectively. When a node in the RAN (e.g. base station, NodeB, eNB, etc.) needs to send a paging message to the mobile telephone, it calculates the timing of the paging message (i.e. the radio frame or sub-frame in which the paging message is to be sent) for the target mobile telephone by taking into account, amongst other things, the DRX cycle length currently applied for that mobile telephone. Paging messages are sent only in those radio frames in which the mobile telephone is known to operate its transceiver, in accordance with its DRX cycle.

SUMMARY OF INVENTION

Technical Problem

More recently, notwithstanding the currently specified maximum values, longer maximum lengths of the DRX cycle have been proposed which may exceed the SF length. Scheduling a DRX cycle using a length of the DRX cycle that is longer than the length of the SF, however, can hinder the effectiveness of the DRX functionality.

For example, a particular problem arises if the mobile telephone is configured with a DRX cycle that exceeds the SF length for that type of RAN (which is currently 40.96 s for UTRAN and 10.24 s for E-UTRAN) that the mobile telephone might not be able to benefit from all the potential reductions in its power consumption. Further, in some cases, the mobile telephone's transceiver might operate out of sync with the paging messages transmitted by the RAN for this mobile telephone, which can result in the mobile telephone listening to paging messages in the correct radio frame, but in the wrong system frame.

For example, the above problems may arise when (in accordance with section 7.1.3.1 of TR23.887) an idle mode mobile telephone is configured with an 'extended' DRX cycle (i.e. a DRX cycle exceeding the length of the SF) for the given RAN, in order to achieve further reductions in the mobile telephone's battery consumption (compared to e.g. using a non-extended DRX cycle). In this case however, if the mobile telephone is configured with an extended DRX cycle that is longer than the SF used in that type of RAN (for example a DRX cycle that is twice the SF duration) and paging for this mobile telephone is scheduled in a single frame of its DRX cycle (for example at SFN #512 of every second system frame), the mobile telephone would have to turn on its transceiver at each frame corresponding to that SFN index in every SF (in this example, each frame number #512) because it cannot distinguish between the same numbered frames of consecutive system frames. This is wasteful of the battery usage of the mobile telephone. Although this problem is not as serious when the DRX cycle is only twice the SF length, the longer the DRX cycle (i.e. the longer the mobile telephone's transceiver is intended to remain off), the more wasteful of the mobile telephone's battery consumption this approach becomes.

On the other hand, if the mobile telephone tries to maximise its power savings by not turning on its transceiver in each radio frame having an SFN index common with the SFN index for paging, then there is a risk that some or all of the paging messages will not be received by this mobile telephone, especially when the mobile telephone and the RAN do not count the first SF of the applicable DRX cycle from the same SF (the mobile telephone and RAN being out of sync).

Therefore, using the current techniques, it is not possible to optimise power savings and at the same time minimise failure of reception of system messages by the mobile telephone.

The present invention aims to provide an improved communication system and improved components thereof which overcome or at least alleviate one or more of the above issues.

Solution to Problem

In one aspect, the invention provides a mobile telephone for communicating with a network entity in a communication system which uses a plurality of system frames wherein each system frame is subdivided in the time domain into a plurality of radio frames, the mobile telephone comprising: means for receiving at least one signalling message indicative of a communication being initiated for said mobile telephone; means for determining whether a current system frame is a first type of system frame in which communication with said mobile telephone is subject to a restriction or a second type of system frame in which communication with said mobile telephone is not subject to said restriction; means for determining whether or not to listen for a communication from said network entity, in said current system frame, in dependence on whether the current system frame is determined to be a first type of system frame or a second type of system frame; and means for listening for a communication from said network entity based on whether or not said determining means determines the current system frame to be a first type of system frame.

The determining means may be operable to determine that said receiver should not listen for a communication from said network entity in said first type of system frame.

In said second type of system frame communication with said mobile telephone may be subject to a power saving cycle in which communications with said mobile telephone are restricted in at least one radio frame. For example, the power saving cycle may comprise a first period of at least one radio frame in which communication with said mobile telephone is restricted and a second period of at least one radio frame in which communication with said mobile telephone is allowed.

The first type of system frame may be a dormant system frame or a wake-up system frame and the second type of system frame may be an active system frame.

The listening means may be operable to listen for a communication from said network entity for the duration of said second period of at least one radio frame. The listening means may be operable to listen for paging and/or system information messages in said second type of system frame.

In one possibility, the mobile telephone may further comprise means for obtaining information identifying a base system frame and information identifying at least one of a first set of system frames of the first type and a second set of system frames of the second type, and the determining means may be operable to determine said current system frame to be said first type of system frame or to be said second type of system frame in dependence on said information identifying said base system frame and said information identifying said at least one of said first and second set of system frames. In this case, for example, the base system frame may comprise a first system frame of said first or said second set of system frames, wherein said first and said second set of system claims follow each other in a cyclical manner, and wherein said determining means may also be operable to determine said current system frame to be included in said first or in said second set of system frames.

The mobile telephone may further comprise means for providing to a network apparatus information relating to a capability of said mobile telephone to communicate using said first and/or said second type of system frame.

The mobile telephone may further comprise means for providing to a network apparatus information relating to said number of said first type of system frames and/or information relating to said number of said second type of system frames to be used in communication with said mobile telephone. In this case, the providing means may be operable to provide to said network apparatus said information identifying said at least one of said first and second set of system frames. For example, the providing means may be operable to generate and send at least one message to a core network entity and to include said information in said at least one message. The at least one message may comprise a non-access stratum (NAS) message. For example, the at least one message may comprise at least one of an Attach message, a Routing Area Update (RAU) message, and a Tracking Area Update (TAU) message.

The mobile telephone may further comprise means for obtaining information relating to a capability of said network entity to communicate with said mobile telephone using said first and/or said second type of system frames. In this case, the capability information obtaining means may be operable to obtain said network capability information from a system information message and/or from a non-access stratum (NAS) message.

The capability information may comprise information relating to compatibility with a power saving cycle (for example, an extended discontinuous reception cycle).

The mobile telephone may further comprise means for obtaining configuration information relating to said first and second set of system frames. In this case, the configuration information obtaining means may be operable to obtain said first and second set of system frames from an Open Mobile Alliance (OMA) device management (DM) entity. For example, the configuration information obtaining means may be operable to receive at least one message from said OMA DM entity, said at least one message comprising said first and second set of system frames.

In another aspect, the invention provides an apparatus for scheduling communications between a mobile telephone and a network entity in a communication system which uses a plurality of system frames wherein each system frame is subdivided in the time domain into a plurality of radio frames, the apparatus comprising: means for determining whether a current system frame is a first type of system frame in which communication with said mobile telephone is subject to a restriction or a second type of system frame in which communication with said mobile telephone is not subject to said restriction; and means for determining whether or not to communicate with said mobile telephone, in said current system frame, in dependence on whether the current system frame is determined to be a first type of system frame or a second type of system frame.

The determining means may be operable to determine that said apparatus should not communicate with said mobile telephone in said first type of system frame.

In said second type of system frame communication with said mobile telephone may be subject to a power saving cycle in which communications with said mobile telephone are restricted in at least one radio frame. For example, the power saving cycle may comprise a first period of at least one radio frame in which communication with said mobile telephone is restricted and a second period of at least one radio frame in which communication with said mobile telephone is allowed.

The apparatus may be operable to communicate with said mobile telephone during said second period of at least one radio frame. For example, the apparatus may be operable to send paging and/or system information messages to said mobile telephone during said second period of at least one radio frame.

The first type of system frame may be a dormant system frame or a wake-up system frame and the second type of system frame may be an active system frame.

The apparatus may further comprise means for obtaining information identifying a base system frame and information identifying at least one of a first set of system frames of the first type and a second set of system frames of the second type and said determining means may be operable to determine said current system frame to be said first type of system frame or to be said second type of system frame in dependence on said information identifying said base system frame and said information identifying said at least one of said first and second set of system frames.

The base system frame may comprise a first system frame of said first or said second set of system frames, wherein said first and said second set of system claims follow each other in a cyclical manner, and wherein said determining means may be operable to determine said current system frame to be included in said first or in said second set of system frames.

The apparatus may further comprise means for obtaining from said mobile telephone information relating to a capability of said mobile telephone to communicate using said first and/or said second type of system frame.

The apparatus may further comprise means for obtaining from said mobile telephone said information relating to said number of said first type of system frames and/or said information relating to said number of said second type of system frames to be used in communication with said mobile telephone. In this case, the obtaining means may be operable to obtain said information identifying said at least one of said first and second set of system frames. The obtaining means may be operable to receive at least one message from said mobile telephone, the at least one message including said information. In this case, the at least one message may comprise a non-access stratum (NAS) message. For example, the at least one message may comprise at least one of an Attach message, a Routing Area Update (RAU) message, and a Tracking Area Update (TAU) message.

The apparatus may further comprise means for providing information relating to a capability of said apparatus to communicate with said mobile telephone using said first and/or said second type of system frames. In this case, the capability information providing means may be operable to provide said network capability information by sending at least one system information message and/or at least one non-access stratum (NAS) message. The capability information may comprise information relating to a compatibility of the apparatus with a power saving cycle (for example, an extended discontinuous reception cycle).

The apparatus may comprise a radio access network entity. In this case, the radio access network entity may comprise means for sending to said mobile telephone information relating to said current system frame. The information relating to said current system frame may comprise current time information and/or an index identifying said current system frame. The sending means may be operable to broadcast system information comprising said information relating to said current system frame.

The apparatus may further comprise means for paging said mobile telephone. The paging means may be operable to page said mobile telephone upon receipt of a request from another entity. The paging means may be operable to page said mobile telephone in dependence on whether the current system frame is determined to be a first type of system frame or a second type of system frame. The paging means may be operable to send a predetermined number of paging messages to said mobile telephone.

The radio access network entity may further comprise means for providing, to a core network entity, information identifying a time when a message from said core network entity was sent by said radio access network entity to said mobile telephone.

The radio access network entity may comprise at least one of a base station and a radio network controller.

The apparatus may comprise a core network entity. In this case, the core network entity may comprise means for detecting a trigger for paging said mobile telephone. The core network entity may be operable to initiate paging of said mobile telephone upon said detecting means detecting said trigger for paging said mobile telephone. For example, the trigger may comprise a new communication being initiated for said mobile telephone.

The core network entity may be operable to request at least one radio access network entity to page said mobile telephone during a system frame of said first type. For example, the core network entity may be operable to request said at least one radio access network entity to page said mobile telephone by sending a paging request to said at least one radio access network entity during a system frame of the first type. The core network entity may also be operable to request said at least one radio access network entity to page said mobile telephone by sending, to each of said at least one radio access network entity, information identifying said at least one of said first and second set of system frames and information for identifying which one of said plurality of system frames is a system frame of the first and second type.

The information identifying which one of said plurality of system frames is a system frame of the first and second type may comprise a system frame index. The information identifying which one of said plurality of system frames is a system frame of the first and second type may comprise a time value.

In another aspect, the invention provides a mobile telephone for communicating with a network entity in a communication system which uses a plurality of system frames wherein each system frame comprises a plurality of radio frames, the mobile telephone comprising a processor and transceiver, wherein: the processor is configured to i) determine whether a current system frame is a first type of system frame in which communication with said mobile telephone is subject to a restriction or a second type of system frame in which communication with said mobile telephone is not subject to said restriction; and ii) determine whether or not to listen for a communication from said network entity, in said current system frame, in dependence on whether the current system frame is determined to be a first type of system frame or a second type of system frame; and the transceiver is configured to listen for a communication from said network entity when it is determined that the current system frame is a first type of system frame.

In another aspect, the invention provides an apparatus for scheduling communications between a mobile telephone and a network entity in a communication system which uses a plurality of system frames wherein each system frame comprises a plurality of radio frames, the apparatus comprising: a processor configured to i) determine whether a current system frame is a first type of system frame in which communication with said mobile telephone is subject to a restriction or a second type of system frame in which communication with said mobile telephone is not subject to said restriction; and ii) determine whether or not to communicate with said mobile telephone, in said current system frame, in dependence on whether the current system frame is determined to be a first type of system frame or a second type of system frame.

In another aspect, the invention provides a method performed by a mobile telephone for communicating with a network entity in a communication system which uses a plurality of system frames wherein each system frame is subdivided in the time domain into a plurality of radio frames, the method comprising: determining whether a current system frame is a first type of system frame in which communication with said mobile telephone is subject to a restriction or a second type of system frame in which communication with said mobile telephone is not subject to said restriction; determining whether or not to listen for a communication from said network entity, in said current system frame, in dependence on whether the current system frame is determined to be a first type of system frame or a second type of system frame; and listening for a communication from said network entity when it is determined that the current system frame is a first type of system frame.

In another aspect, the invention provides a method performed by an apparatus for scheduling communications between a mobile telephone and a network entity in a communication system which uses a plurality of system frames wherein each system frame is subdivided in the time domain into a plurality of radio frames, the method comprising: determining whether a current system frame is a first type of system frame in which communication with said mobile telephone is subject to a restriction or a second type of system frame in which communication with said mobile telephone is not subject to said restriction; and determining whether or not to communicate with said mobile telephone, in said current system frame, in dependence on whether the current system frame is determined to be a first type of system frame or a second type of system frame.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Advantageous Effects of Invention

According to the present invention, it is possible to provide an improved communication system and improved components which optimises power savings and at the same time minimises failure of reception of system messages by the mobile telephone.

DESCRIPTION OF EMBODIMENTS

Overview

Figure 1:
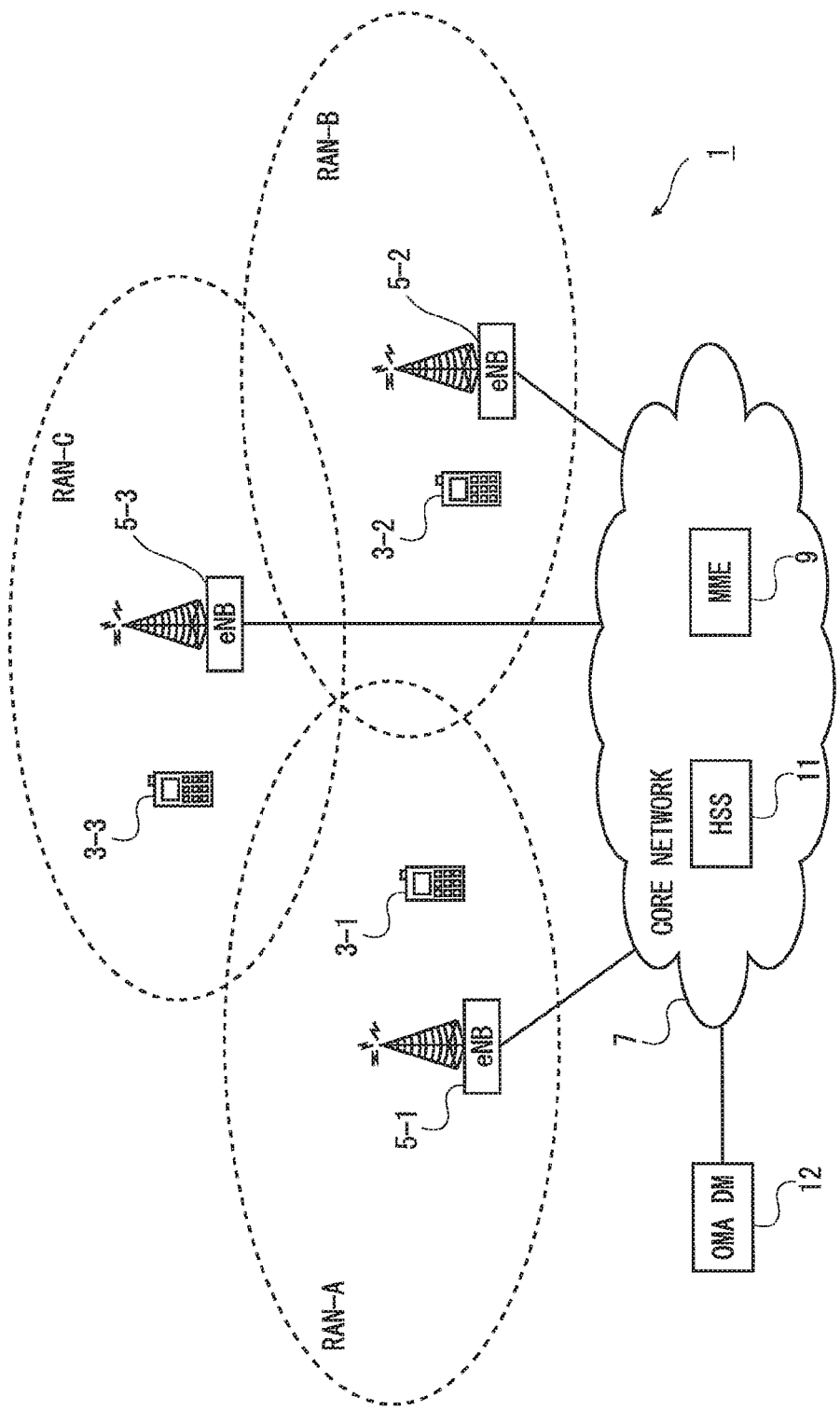
FIG. 1 schematically illustrates a mobile telecommunication system to which embodiments of the invention may be applied.

FIG. 1 schematically illustrates a mobile (cellular) telecommunication system 1 that includes user equipment, e.g. mobile telephones 3-1 to 3-3 and a number of base stations 5-1 to 5-3. Each of the base stations 3 shown in FIG. 1 belongs to a different radio access network RAN-A to RAN-C, respectively, and each radio access network shown includes only one base station for the sake of simplicity. However, it will be appreciated that in a deployed system each radio access network typically comprises other base stations as well and/or any of the base stations may belong to more than one radio access network. Similarly, although three mobile telephones 3 are shown in FIG. 1 for the sake of simplicity, it will be appreciated that many more mobile telephones 3 can be provided in a deployed system.

In this system, each base station 5 is coupled to a core network 7 that includes, amongst other, a Mobility Management Entity (MME) 9 that manages the mobility of mobile telephones 3 within the network, and a Home Subscriber Server (HSS) 11 which stores and enforces user subscription related configuration. The system also includes a so-called Open Mobile Alliance (OMA) Device Management (DM) server 12 for configuring various operating parameters of the mobile telephones 3 (via the core network 7 and the RANs).

The core network 7 is also coupled to other networks, such as the Internet (not shown). Using this network architecture, the mobile telephone 3 can access the core network 7 and/or the Internet via one or more of the cells operated by the base stations 5-1 to 5-3.

In this system, each radio access network supports DRX functionality as defined in the relevant 3GPP specifications discussed above. However, the core network 7 and possibly some of the RANs also support a so-called 'Extended DRX' functionality. This Extended DRX (or 'E-DRX') functionality beneficially allows the network to apply a DRX cycle, for a given mobile telephone 3, which is longer in duration than the maximum length of the system frame defined for that type of radio access network whilst ensuring appropriate synchronisation of the DRX cycle in order to maximise power savings and ensure that the mobile telephone 3 listens in appropriate radio frames for paging messages or the like.

As specified in section 10.5.5.6 of 3GPP TS24.008, the contents of which are incorporated herein by reference, a mobile telephone 3 is required to notify the RAN (via a core network element such as an SGSN, an MME, etc.) about its current (core network specific) DRX cycle length (if applicable) in a so-called 'DRX parameter' information element (IE). The DRX specific values that may be used in accordance with the current version of TS24.008 are illustrated in Table 1 below.

A mobile telephone 3 configured with a DRX functionality may provide the DRX parameter IE to the core network 7 during a location registration procedure (e.g. in an 'Attach' request, a 'Routing Area Update' (RAU) request, or a 'Tracking Area Update' (TAU) request sent to a core network entity). When a subsequent trigger for paging the mobile telephone 3 (such as downlink data transfer from inside/outside the network) occurs, the core network 7 informs the RAN(s) about the target mobile telephone's 3 relevant DRX parameters and identifier (e.g. the mobile telephone's 3 International Mobile Subscriber Identifier or 'IMSI') thereby instructing the appropriate RAN(s) to carry out paging of the mobile telephone 3 according to the applicable DRX configuration. The RAN(s) can thus calculate paging timing for the target mobile telephone 3 from the received DRX parameter and IMSI and send one or more paging message(s) to the mobile telephone 3 at the calculated time (i.e. in radio frame(s) in which the transceiver of that particular mobile telephone 3 is expected to be active). Further details of the DRX scheduling are defined in section 7.1 of 3GPP TS36.304 for E-UTRAN and in section 8.3 of 3GPP TS25.304 for UTRAN, the contents of which are incorporated herein by reference.

3GPP TR23.887 describes possible solutions for UE power consumption optimisation. In section 7.1.3.1 of TR23.887 an 'extended' DRX cycle (i.e. exceeding the length of the SF) is suggested for the UTRAN/E-UTRAN in idle mode, which can be configured by using one of the newly defined DRX cycle length values in the DRX parameter IE. The suggested values for this extended DRX cycle are illustrated in Table 2 below.

TABLE 1

DRX cycle lengths previously defined in TS24.008

| bits | | | | | UTRAN DRX | E-UTRAN DRX |
|---|---|---|---|---|---|---|
| 8 | 7 | 6 | 5 | Iu and S1 mode specific | (sec) | (sec) |
| 0 | 0 | 0 | 0 | For Iu mode, CN Specific DRX cycle length coefficient not specified by the UE, i.e. the system information value | | |

TABLE 1-continued

DRX cycle lengths previously defined in TS24.008

| bits | | | | Iu and S1 mode specific | UTRAN DRX (sec) | E-UTRAN DRX (sec) |
|---|---|---|---|---|---|---|
| 8 | 7 | 6 | 5 | | | |
| | | | | 'CN domain specific DRX cycle length' is used. For S1 mode, DRX value not specified by the UE. | | |
| 0 | 1 | 1 | 0 | CN Specific DRX cycle length coefficient 6 and T = 32 | 0.64 | 0.32 |
| 0 | 1 | 1 | 1 | CN Specific DRX cycle length coefficient 7 and T = 64 | 1.28 | 0.64 |
| 1 | 0 | 0 | 0 | CN Specific DRX cycle length coefficient 8 and T = 128 | 2.56 | 1.28 |
| 1 | 0 | 0 | 1 | CN Specific DRX cycle length coefficient 9 and T = 256 | 5.12 | 2.56 |

TABLE 2

Extended DRX cycle lengths in accordance with TR23.887

| bits | | | | Iu and S1 mode specific | UTRAN DRX (sec) | E-UTRAN DRX (sec) |
|---|---|---|---|---|---|---|
| 8 | 7 | 6 | 5 | | | |
| 1 | 0 | 1 | 0 | CN Specific DRX cycle length coefficient 10 and T = 512 | 10.24 | 5.12 |
| 1 | 0 | 1 | 1 | CN Specific DRX cycle length coefficient 11 and T = 1024 | 20.48 | 10.24 |
| 1 | 1 | 0 | 0 | CN Specific DRX cycle length coefficient 12 and T = 2048 | 40.96 | 20.48 |
| 1 | 1 | 0 | 1 | CN Specific DRX cycle length coefficient 13 and T = 4096 | 81.92 | 40.96 |
| 1 | 1 | 1 | 0 | CN Specific DRX cycle length coefficient 14 and T = 8192 | 163.84 | 81.92 |
| 1 | 1 | 1 | 1 | CN Specific DRX cycle length coefficient 15 and T = 16384 | 327.68 | 163.84 |

In the system illustrated in FIG. 1, the mobile telephone 3 and the network (i.e. the core network 7/the RAN serving the mobile telephone 3) also support DRX cycles longer than the SF length applicable for that type of RAN. In this embodiment however, the way in which this is facilitated is enhanced by way of so-called 'dormant' system frames in which no communications are to be scheduled and 'active' system frames in which communications may be scheduled.

The mobile telephone 3 and the network (i.e. an entity in the core network 7 and/or the RAN serving the mobile telephone 3) communicate with one another to configure a DRX cycle to be used for communications with that mobile telephone 3 and to specify how many dormant SFs and how many active SFs will be used in communications with that mobile telephone 3 and/or in which order the dormant and active SFs will follow each other. In order to ensure that the mobile telephone 3 and the network remain synchronised during the extended DRX cycle, the mobile telephone 3 and the network exchange with each other information identifying at least the first SF of the DRX cycle for the mobile telephone 3. The dormant and active SFs are thus UE specific and can be configured by/for each mobile telephone 3 as needed (e.g. in dependence on the level of power optimisation needed for a particular mobile telephone 3).

In this system, the mobile telephone 3 is configured to activate its transceiver, in any active SFs, according to normal DRX scheduling methods defined in the current 3GPP specification for non-extended DRX cycles (i.e. DRX cycles that do not exceed the length of the system frame). However, the mobile telephone 3 is configured to switch off its receiver (and hence not listen for any paging messages) for the duration of each dormant SF. In other words, although the DRX cycle extends over multiple system frames, communication between the network and the mobile telephone 3 is restricted to some of the system frames only. Thus any system frames in which no communication is expected/scheduled can be classified as dormant SFs whereas any system frames in which communication is expected/can be scheduled can be classified as active SFs (even if actual communication does not actually take place is such active system frames between the network and the mobile telephone 3).

Since the network is also aware of the current DRX configuration for the mobile telephone 3 and also controls/keeps track of its current operational mode (e.g. 'RRC active'/'RRC idle'), the network is beneficially able to schedule any paging messages during active SFs and to avoid scheduling any paging messages (or any other communications) for the mobile telephone 3 during dormant SFs. This approach beneficially improves the power conservation capabilities of the mobile telephone 3 operating in a DRX mode without hindering the successful delivery of paging/signalling messages to the mobile telephone 3 (e.g. due to the mobile telephone 3 and the network being out of sync during their respective DRX cycles).

This way, it is possible to configure various kinds of extended DRX cycles for the mobile telephone 3 by simply selecting the appropriate number (and order) of active and dormant system frames for the desired DRX cycle. Once the DRX functionality is activated for the mobile telephone 3, a set of one or more active SFs will follow a set of one or more dormant SFs in the specified configuration and in a cyclical manner until the DRX cycle is reconfigured or the mobile telephone 3 moves to a different RAN.

In the following, the use of extended DRX cycles based on a combination of active and dormant SFs are referred to as the extended DRX feature and the procedure in which the mobile telephone 3 switches off its receiver for the duration of any dormant SFs and performs normal DRX procedures according to the current (non-extended) DRX methods during active SFs is referred to as the extended DRX procedure.

By way of an example scenario in the system shown in FIG. 1, further details of the extended DRX feature and related procedures are given below.

In this particular example, the mobile telephone 3-2 is being served by RAN-B (which supports extended DRX cycles). Initially, the mobile telephone 3-2 registers its location with the core network 7 by performing an appropriate RAU/TAU procedure upon the mobile telephone 3-2 entering a cell of the base station 5-2. During this procedure, the mobile telephone 3-2 also provides its DRX configuration to the RAN-B (e.g. to the base station 5-2 or another node of RAN-B) by including a DRX parameter IE in a message sent to the core network 7. The DRX configuration may be provided to the RAN-B either directly, or via the core network 7, e.g. as part of the above RAU/TAU procedure.

During the RAU/TAU procedure the core network 7 provides an indication to the mobile telephone 3 to identify the first SF of the extended DRX cycle (which, in this example, is also the first active SF of the set of one or more active SFs) to ensure that the mobile telephone 3 and the network remain in sync with each other. This indication may be, for example, a time value and/or another identification of the system frame representing a first SF of the mobile telephone's 3-2 extended DRX cycle at least whilst the mobile telephone 3-2 is being served via the current RAN(s), in this case RAN-B. Of course, as its name implies, the DRX cycle is cyclical, thus there are more than one 'first system frame' that can be indicated to the mobile telephone 3-2. However, regardless of which 'first SF' is indicated, the mobile telephone 3-2 can always work out the first SF of the current DRX round (since the length of one round of the extended DRX cycle is known).

When the mobile telephone 3-2 enters into an RRC idle mode (i.e. when its 'T3' timer configured by the RAN-B expires) whilst attached to the RAN-B, it invokes an extended DRX cycle as specified in its DRX configuration and using the indication provided by the core network 7 identifying the first SF of this extended DRX cycle. Of course, it will also be appreciated that the extended DRX cycle might be invoked by other means, i.e. regardless of the RRC mode of the mobile telephone 3-2.

When the core network 7 detects a trigger for paging the mobile telephone 3-2 (e.g. an incoming call, a request for a downlink data transfer, or the like), it requests the RAN-B currently serving this mobile telephone 3-2 to carry out paging of the mobile telephone 3-2. The core network 7 also provides the mobile telephone's 3-2 DRX configuration to the RAN-B (if it hasn't been provided yet) and the IMSI associated with the mobile telephone 3-2 so that the RAN-B can schedule the paging messages accordingly (i.e. to the right mobile telephone 3-2 and at the right time).

In this particular example, the RAN-B will determine, from the status of the mobile telephone 3-2, the relevant DRX configuration information and IMSI available to it that the mobile telephone 3-2 is configured with an extended DRX cycle. Therefore, before sending any paging messages, the RAN-B (e.g. base station 5-2 serving the mobile telephone 3-2) checks whether the current system frame is an active SF or a dormant SF for this particular mobile telephone 3-2. If the RAN-B determines that the current system frame is an active SF for this mobile telephone 3-2, it schedules a paging message in the appropriate radio frame of the current system frame and thus alerts the mobile telephone 3-2 about the new communication being initiated for the mobile telephone 3-2. In order to minimise loss or incorrect reception of the paging message, the paging message may be re-sent for a predetermined (operator specific) number of times during the same or subsequent active system frame(s) at least until the mobile telephone 3-2 confirms receipt of the paging message (either explicitly or implicitly).

On the other hand, if the RAN-B determines that the current system frame is a dormant SF for this mobile telephone 3-2, it does not schedule (i.e. delays transmission of) any paging messages until the next active SF for this mobile telephone 3-2.

This approach beneficially provides a flexible, extended DRX cycle solution that results in improved battery life of the mobile telephone without compromising on its ability to receive paging messages (and other system updates) without unnecessary delay.

LTE Frame Structure

Before discussing the specific ways in which embodiments of the invention can be implemented, a brief description will be given of the access scheme and a general frame structure agreed for LTE communications. An Orthogonal Frequency Division Multiple Access (OFDMA) technique is used for the downlink to allow the mobile telephone 3 to receive data over the air interface with the base station 5. Different sub-carriers are allocated by the base station 5 (for a predetermined amount of time) to the mobile telephone 3 depending on the amount of data to be sent to the mobile telephone 3. These blocks of sub-carriers are referred to as physical resource blocks (PRBs) in the LTE specifications. PRBs thus have a time and frequency dimension. The base station 5 dynamically allocates PRBs for each device that it is serving and signals the allocations for each radio frame to each of the scheduled devices in a control channel.

Figure 2A:
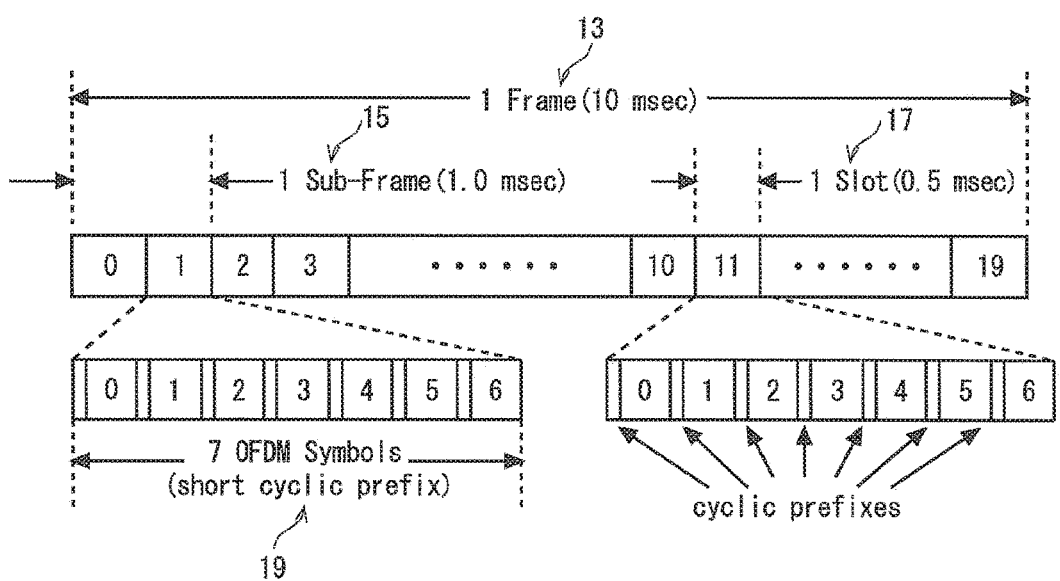
FIG. 2A illustrates a generic frame structure defined for use in the LTE communication network.
Figure 2B:
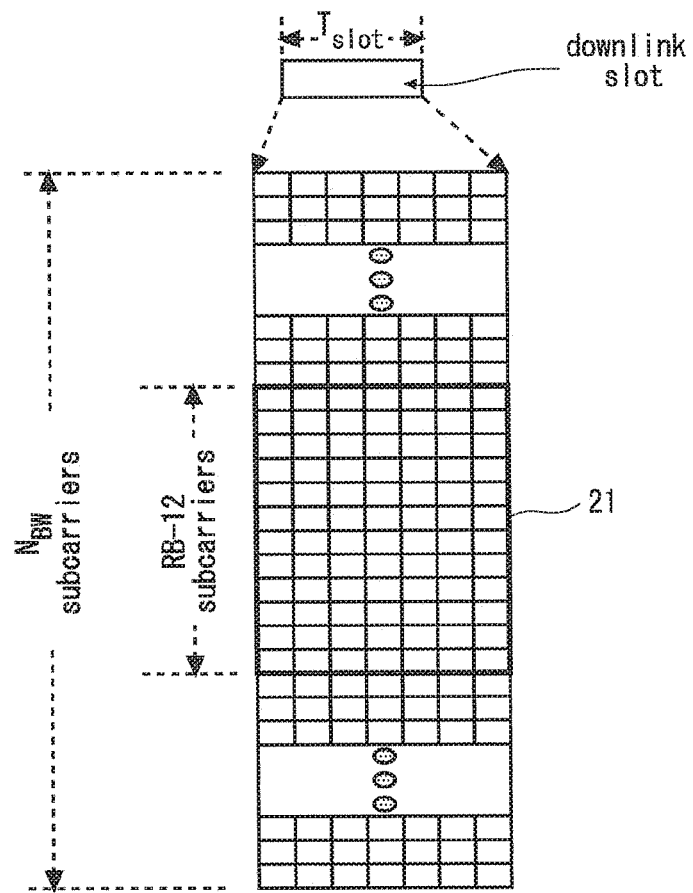
FIG. 2B illustrates the way in which a slot illustrated in FIG. 2a is formed of a number of time-frequency resources.

FIG. 2a illustrates one generic frame structure agreed for LTE communications over the air interface with the base station 5. As shown, one frame 13 is 10 ms (milliseconds) long and comprises ten sub-frames 15 of 1 ms duration (known as a Transmission Time Interval (TTI)). Each sub-frame or TTI comprises two slots 17 of 0.5 ms duration. Each slot 17 comprises either six or seven OFDM symbols 19, depending on whether the normal or extended cyclic prefix (CP) is employed. The total number of available sub-carriers depends on the overall transmission bandwidth of the system. The LTE specifications define parameters for system bandwidths from 1.4 MHz to 20 MHz and one PRB is currently defined to comprise twelve consecutive subcarriers for one slot 17 (although this could clearly be different). The transmitted downlink signal comprises NBW subcarriers for a duration of Nsymb OFDM symbols. It can be represented by a resource grid as illustrated in FIG. 2b. Each box in the grid represents a single sub-carrier for one symbol period and is referred to as a resource element (RE). As shown, each PRB 21 is formed from twelve consecutive sub-carriers and (in this case) seven symbols for each subcarrier; although in practice the same allocations are made in the second slot 17 of each sub-frame 15 as well.

As mentioned above, the so-called system frame represents the largest time interval within the above described frame structure which can be used for synchronisation between the radio access network and the mobile telephone 3. The length of the system frame is dependent on the type of access network and currently it is defined as 4096 frames 13 (i.e. 40.96 seconds) for UTRAN and 1024 frames 13 (i.e. 10.24 seconds) for E-UTRAN. Further details of the frame structure can be found in 3GPP standards specification TS25.402 for UTRAN, and TS36.331 and TS36.211 for E-UTRAN, the entire contents of which are incorporated herein by reference.

Mobile Telephone

Figure 3:
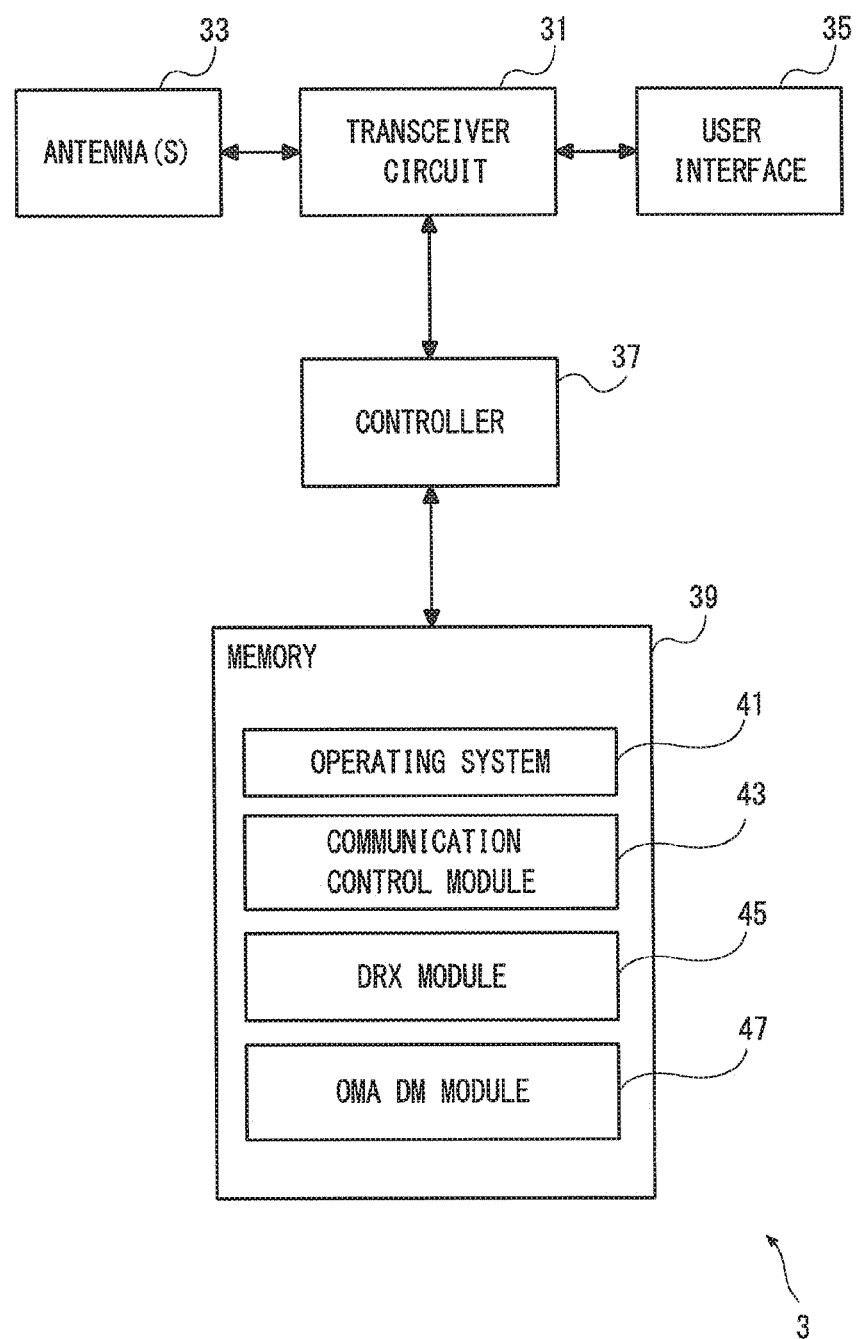
FIG. 3 is a block diagram illustrating the main components of the mobile telephone forming part of the system shown in FIG. 1.

FIG. 3 is a block diagram illustrating the main components of the mobile telephone 3 shown in FIG. 1. As shown, the mobile telephone 3 includes a transceiver circuit 31 which transmits signals to, and receives signals from, the base station 5 via antenna 33. Although not necessarily shown in FIG. 3, the mobile telephone 3 may of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile telephone 3 by, in this example, program instructions or software instructions stored within the memory 39. As shown, these software instructions include, among other things, an operating system 41, a communications control module 43, a discontinuous reception module 45; and an open mobile alliance device management module 47.

The communications control module 43 controls communication with the base station 5 including, for example, allocation of resources to be used by the transceiver circuit 31 in its communications with the base station 5. The communications control module 43 also controls communication with the core network 7 (via the base station 5).

The discontinuous reception module 45 controls the discontinuous reception (and/or transmission) operation of the mobile telephone 3, e.g. when the mobile telephone is in idle mode. The discontinuous reception module 45 also provides the configuration of the discontinuous reception of the mobile telephone 3 to the core network 7 (via transceiver circuit 31) in an appropriately formatted signalling message. If the mobile telephone 3 is attached to a RAN which supports the extended DRX cycle functionality, the discontinuous reception module 45 also keeps track of the active and dormant system frames.

The open mobile alliance device management module 47 is operable to interface with the OMA DM entity 12 (via the core network 7) for receiving and storing configuration parameters for the extended DRX cycle functionality of the mobile telephone 3.

Base Station

Figure 4:
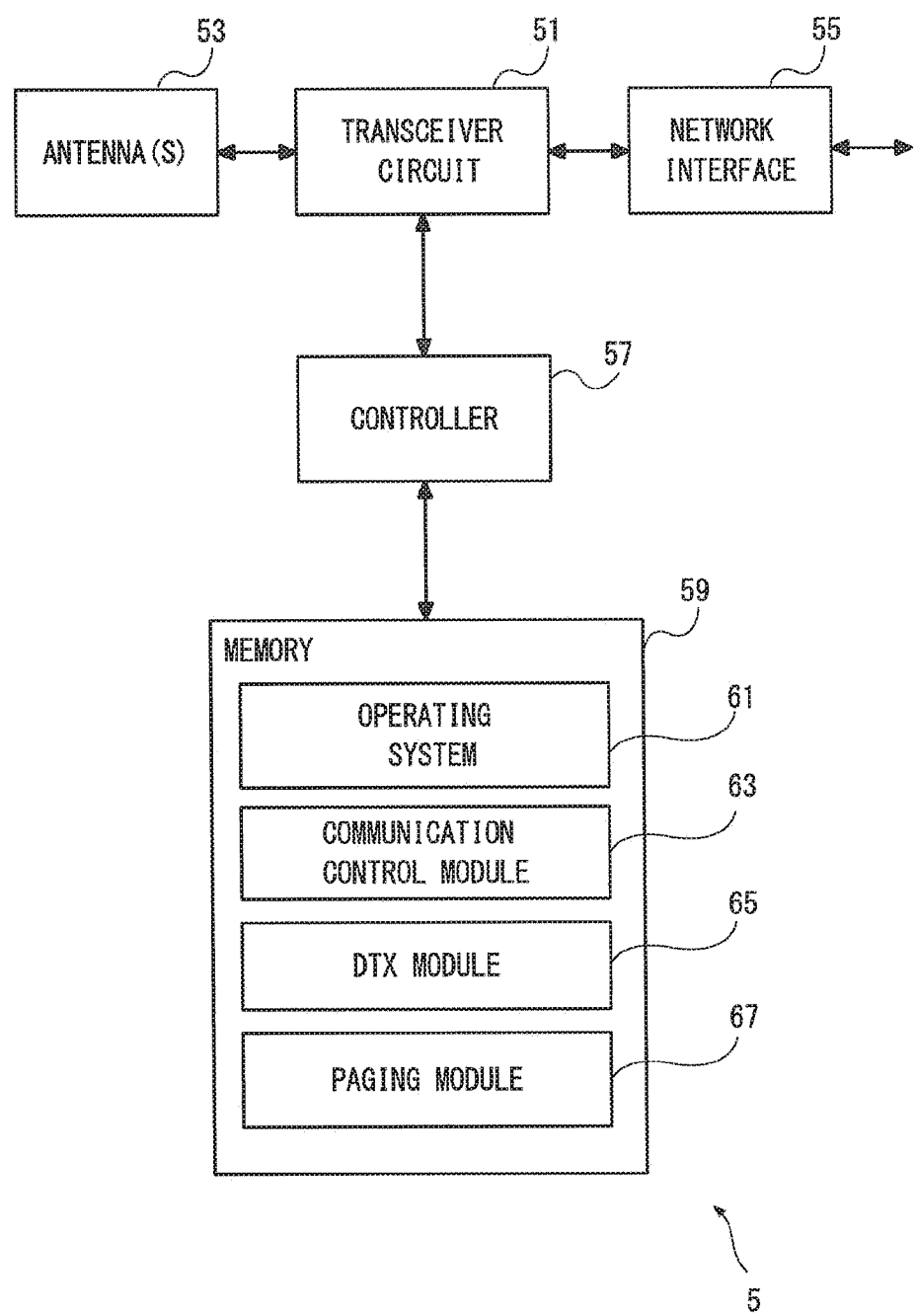
FIG. 4 is a block diagram illustrating the main components of a base station forming part of the system shown in FIG. 1.

FIG. 4 is a block diagram illustrating the main components of a base station 5. The base station 5 is a fixed communications node providing services to user equipment (e.g. the mobile telephones 3) within its coverage area (i.e. one or more cells). As shown, the base station 5 includes a transceiver circuit 51 which transmits signals to, and receives signals from, the mobile telephone 3 via at least one antenna 53. The base station 5 also transmits signals to and receives signals from the core network 7 via a network interface 55.

The controller 57 is configured to control overall operation of the base station 5 by, in this example, program instructions or software instructions stored within the memory 59. As shown, these software instructions include, among other things, an operating system 61, a communications control module 63, a discontinuous transmission module 65, and a paging module 67.

The communications control module 63 controls communications between the base station 5 and the mobile telephones 3, and the network devices such as the MME 9, the HSS 11, and the OMA DM 12.

The discontinuous transmission module 65 controls the discontinuous transmission (and reception) of messages between the base station 5 and the mobile telephones 3 attached thereto. The discontinuous reception module 65 receives the DRX configuration applicable for a particular mobile telephone 3 either directly from that mobile telephone 3 or via the core network 7. If the base station 5 (i.e. the RAN to which it belongs) supports the extended DRX cycle functionality, the discontinuous transmission module 65 also keeps track of the active and dormant system frames for the mobile telephones 3 this base station 5 is currently serving.

The paging module 67 performs paging for the mobile telephones 3 in the base station's 5 coverage area, upon receiving an appropriately formatted paging request from the core network 7, in accordance with the DRX configuration (if any) configured for the particular mobile telephone 3 to be paged.

In the above description, the mobile telephone 3 and the base station 5 are described for ease of understanding as having a number of discrete modules (such as the communications control modules and the DRX/DTX modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Operation

A number of different embodiments will now be described that illustrate how different aspects of the invention can be put into effect using components of the above described system. The embodiments will be described with reference to the timing diagrams shown in FIG. 5 to FIG. 8.

First Embodiment—DRX Cycle Synchronisation Using Current Time Information

Figure 5:
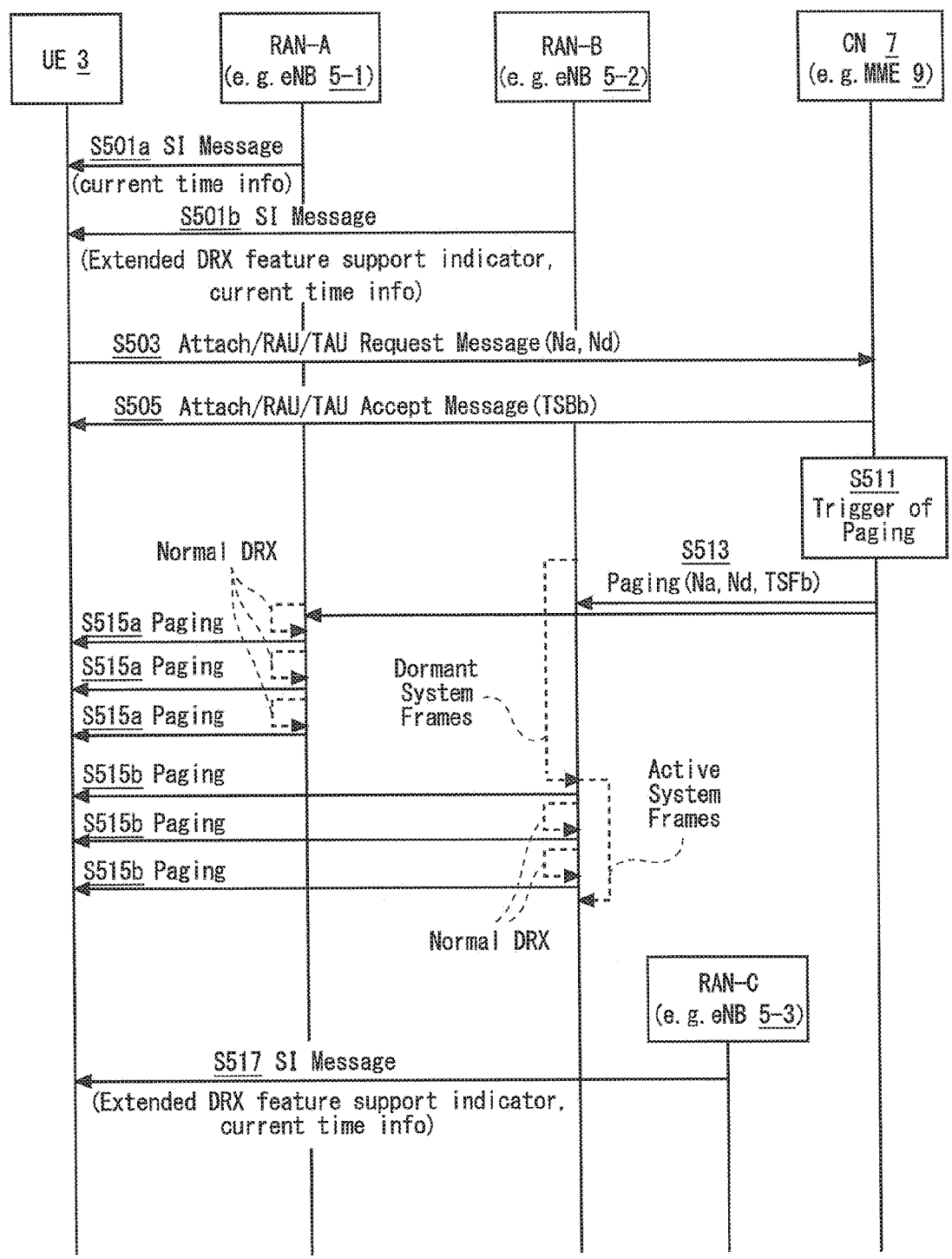
FIG. 5 shows an example timing diagram illustrating a method performed by components of the communication system when transmitting paging messages to a mobile telephone employing an extended DRX cycle.

FIG. 5 shows an example timing diagram illustrating a method performed by components of the communication system 1 when carrying out paging of a mobile telephone 3 configured with an extended DRX cycle.

In this embodiment, the mobile telephone 3 obtains current time information from the respective RAN(s) it is currently using. In this example, the current time information is broadcast as part of the System Information (SI) message, as generally shown in steps S501a and S501b performed by (the base stations 5 of) RAN-A and RAN-B, respectively. The current time information allows the mobile telephone 3 to synchronise the operation of its modules to the RAN it is using. In this example, the SI message broadcast by RAN-B (at S501b) also includes an indicator (e.g. an 'Extended DRX feature support indicator' flag, IE, or the like) informing the mobile telephone 3 that the RAN-B supports the extended DRX cycle feature. Therefore, the mobile telephone 3 can be notified by way of the SI broadcast that DRX cycles longer than the applicable system frame can be used in the RAN-B, if required.

Using information obtained from the SI broadcast message (e.g. an identifier of the RAN and/or a cell of a base station 5 forming part of the RAN, applicable channel configuration, list of radio technologies supported by the RAN, etc.), the mobile telephone 3 informs the core network 7 (e.g. the MME 9 or another core network entity) about its current location. In order to do so, the communications control module 43 generates and sends (via a base station 5 of its RAN) an appropriately formatted non-access stratum (NAS) message to the core network 7. As shown at step S503, this NAS message may include any one (or more) of an 'Attach Request' message, a 'RAU Request' message, and a 'TAU Request' message. The mobile telephone 3 also includes in this message information relating to its DRX configuration, for example, parameters specifying the number of active SFs (Na) and the number of dormant SFs (Nd).

The core network 7 (which also supports the extended DRX feature) can determine that the mobile telephone 3 supports the extended DRX feature when it receives the above parameters (i.e. Ns and Nd). Therefore, the core network 7 selects a suitable time of base SF (TSFb) for this mobile telephone 3. The core network can select any point in time as the TSFb, for example, the time of receipt of the Attach/RAU/TAU request message from the mobile telephone 3, the time of sending the Attach/RAU/TAU accept message, or any arbitrary (past or future) time such as '2013-01-01 00:00:00.00'.

The core network 7 stores the received Na, Nd parameters and the generated TSFb value as the UE specific parameters for the extended DRX feature with respect to this mobile telephone 3. Then, in step S505, the core network informs the mobile telephone 3 about the selected base time (i.e. TSFb parameter) by generating and sending (via the RAN(s) serving the mobile telephone 3) an appropriately formatted Attach/RAU/TAU accept message. This message informs the mobile telephone that the core network 7 supports the extended DRX feature. Upon receipt of the message at S505, the mobile telephone 3 stores the received TSFb parameter in its memory 39.

Figure 10A:
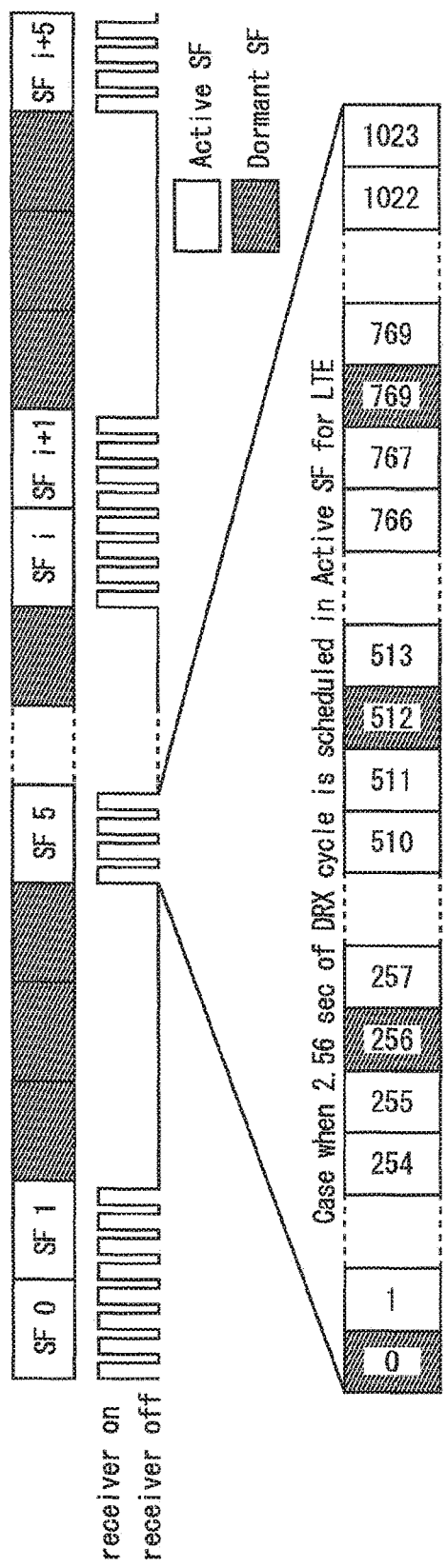
FIG. 10A illustrates an exemplary extended DRX cycle applicable to the LTE frame structure for E-UTRAN.
Figure 10B:
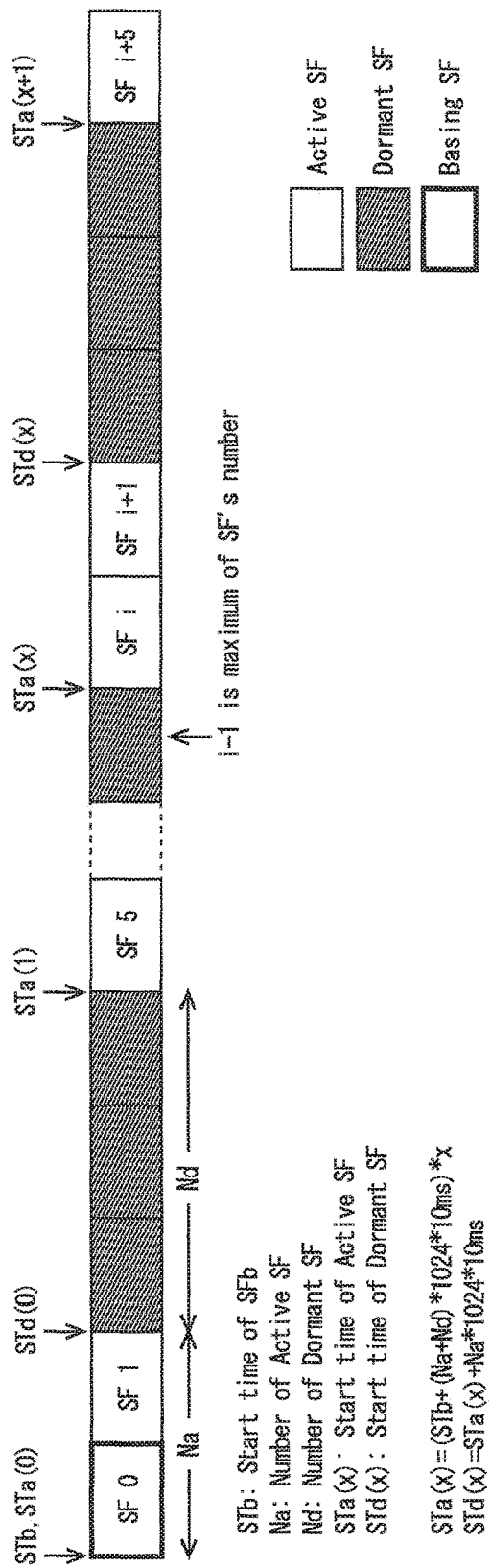
FIG. 10B illustrates an exemplary method for calculating scheduling of active and dormant system frames in E-UTRAN.
Figure 11A:
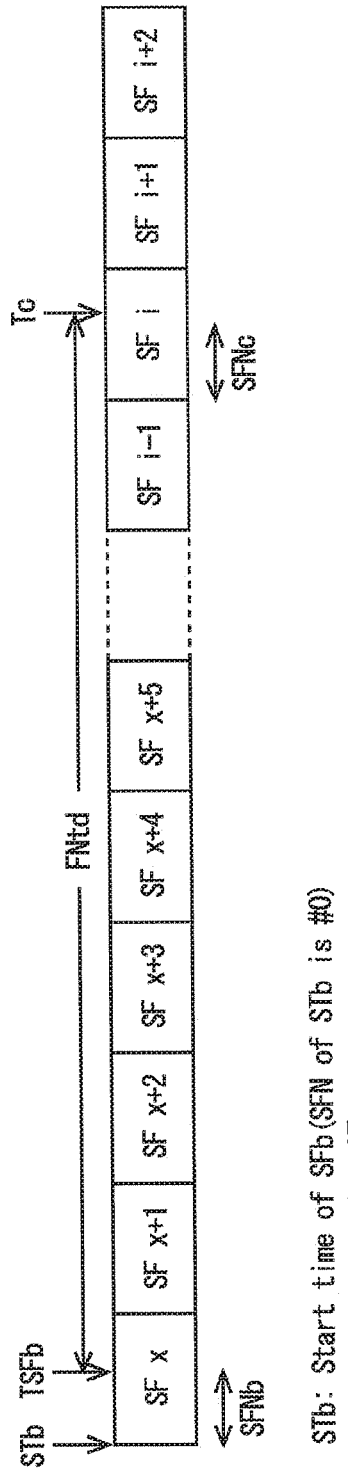
FIG. 11A illustrates an exemplary method for calculating a base system frame by the mobile telephone using the current time and current system frame number and a time parameter related to the base system frame provided by the core network.

If the current RAN that the mobile telephone 3 camps on also supports the extended DRX feature, the DRX module 45 calculates the start time of the SFb (hereafter referred to as STb) by working out the remaining time between the current time (within the current SFN) and the TSFb using the formula shown in FIG. 11*a*. The DRX module 45 can also calculate the timing of the active SFs and dormant SFs according to the formula illustrated in FIG. 10*b*. However, if the mobile telephone's 3 current RAN does not support the extended DRX feature it is not necessary for the DRX module 45 to perform these calculations.

Next, when the core network 7 needs to initiate paging, it sends the Na, Nd and TSFb parameters to the RAN(s) serving this mobile telephone 3. In order to do so, the core network 7 generates and sends, at step S513, a paging request (in this example to RAN-A and RAN-B). When RAN-A, which does not support the extended DRX feature, receives the message at S513, it ignores the included Na, Nd and TSFb parameters (i.e. without returning any error message to the core network 7) as it is unable to interpret them.

As shown generally at step S515A, RAN-A generates and sends one or more paging messages to the mobile telephone 3 according to the normal DRX procedure defined in the current 3GPP specifications. Since the mobile telephone 3 knows (from the SI message at S501*a*) that RAN-A does not support the extended DRX feature, it receives the paging messages correctly by following the existing (non-extended) DRX procedures for this RAN-A.

On the other hand, when RAN-B (which supports the extended DRX feature) receives the message at S513, it calculates the STb according to the method shown in FIG. 11*a*, and also calculates the timing of the active SFs and dormant SFs according to the method shown in FIG. 10*b*.

If the current system frame, i.e. when the paging request is received (at S513), is a dormant SF (according to the calculations in the previous paragraph), the RAN-B delays sending of any paging messages until the next active SF, as generally shown at S515*b*. Then in the next active SF(s), the RAN-B generates and sends one or more paging messages to the mobile telephone 3. The exact number and frequency of paging messages is implementation dependent. Since both the RAN-B and the mobile telephone 3 follow the same timing of the extended DRX procedure, the mobile telephone 3 operates its transceiver 31 and is capable to receive the paging messages correctly during the active SFs.

If necessary, the mobile telephone 3 can select another RAN (e.g. instead of RAN-A which does not support the extended DRX functionality) by monitoring SI messages broadcast by other RANs in its geographical area. For example, the mobile telephone can receive, at step S517, the SI message broadcast by RAN-C. The mobile telephone 3 can camp on RAN-C. In this case the mobile telephone 3 also needs to synchronise to the new RAN-C, and calculate the STb value and timing of active and dormant SFs for RAN-C in a similar manner as described above for RAN-B.

This approach ensures that the mobile telephone 3 always remains in sync with the radio access network it is camping on and thus improves the efficiency of delivery of paging messages whilst also reduces the mobile telephone's 3 battery consumption.

Second Embodiment—DRX Cycle Synchronisation Using Time of Location Registration

Figure 6:
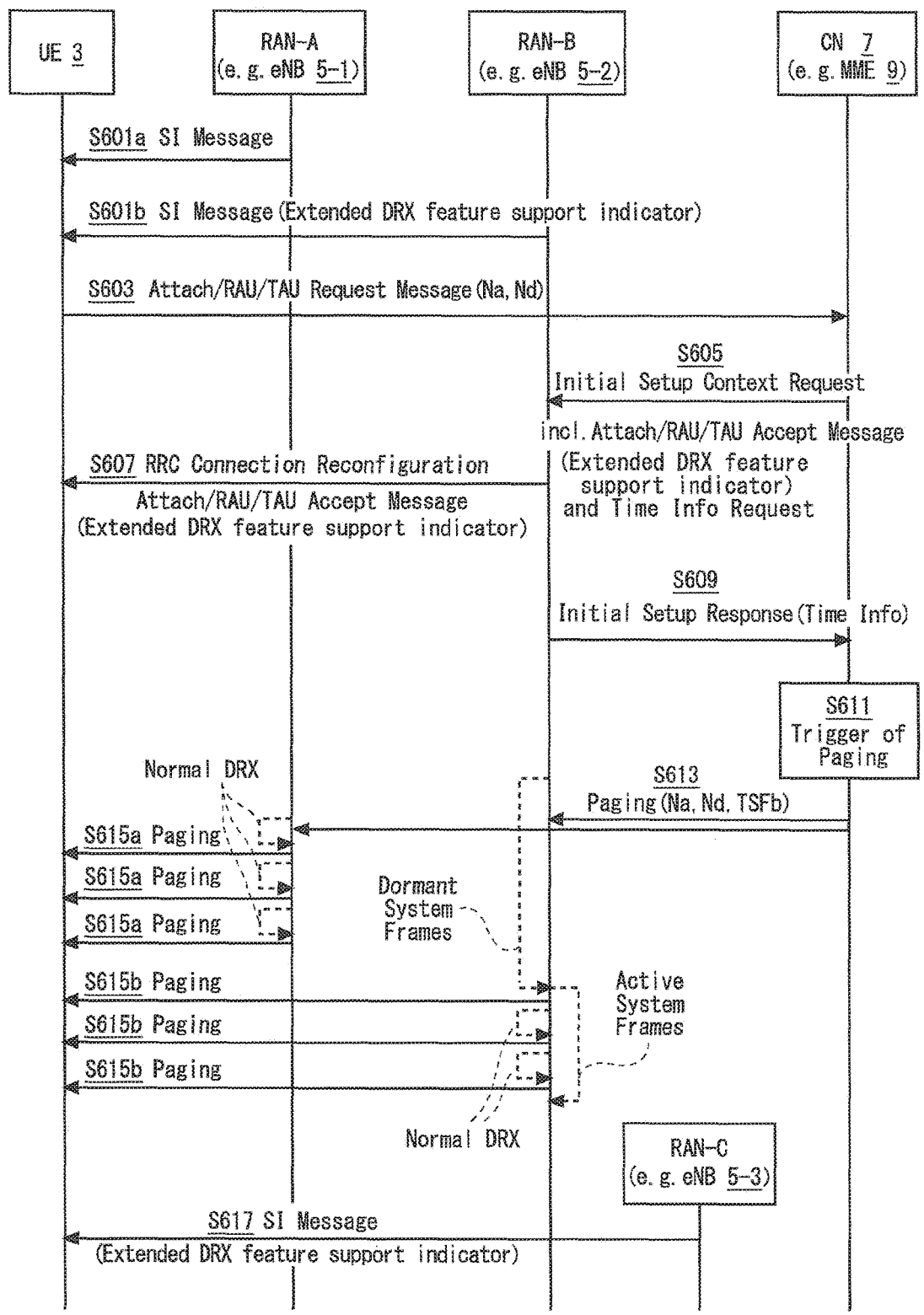
FIG. 6 shows an example timing diagram illustrating a modification of the method shown in FIG. 5.

FIG. 6 shows an example timing diagram illustrating a method performed by components of the communication system 1 when carrying out paging of a mobile telephone 3 configured with an extended DRX cycle. This embodiment generally follows the first embodiment, however, instead of the core network selecting an arbitrary start time for the mobile telephone's 3 extended DRX cycle, a request-response procedure is carried out between the core network 7 and the RAN to derive a UE specific start time for the extended DRX cycle.

Steps S601*a* and S601*b* generally correspond to the respective SI broadcast messages at S501*a* and S501*b* described above with reference to FIG. 5. However, the messages sent at S601*a* (by RAN-A) and at S601*b* (by RAN-B) do not carry the current time information for the given RAN. Alternatively, if the messages at steps S601*a*/S601*b* include the current time information, in this embodiment the mobile telephone 3 can ignore this information.

Step S603 generally corresponds to S503 of FIG. 5 and hence it will not be described in detail. The message at S603 is used by the mobile telephone 3 to inform the core network 7 about its DRX configuration and it also includes the Na and Nd parameters configured for the mobile telephone 3.

However, in this embodiment, instead of responding to the request at S603, the core network 7 generates and sends, at step S605, an appropriately formatted setup message to the RAN on which the mobile telephone 3 currently camps (as indicated in the preceding message). The core network 7 also includes in this setup message the appropriate Attach/RAU/TAU accept message (which includes an indication of the core network's 7 capability to support the extended DRX feature) for the mobile telephone 3. In case of E-UTRAN, the setup message to the RAN may comprise, for example, an 'Initial Setup Context Request' message. In this case, the core network 7 also includes a time info request parameter instructing the compatible RAN to return information identifying the time when the Attach/RAU/TAU accept message is sent to mobile telephone 3.

When sending the message setup at S605, the core network 7 provisionally stores the time of sending this message as 'provisional' start of the extended DRX cycle (provisional TSFb) for this mobile telephone 3.

Upon receipt of the setup message (e.g. Initial Setup Context Request message) by the RAN including the Attach/RAU/TAU accept message for the mobile telephone 3 and the time info request, the RAN generates and sends, at step S607, an RRC message (e.g. a 'Connection Reconfiguration' message or other suitable message) instructing the mobile telephone 3 to configure its communication control module 43 for communication with the given RAN (in this case, RAN-B). This RRC message also includes the Attach/RAU/TAU accept message from the core network 7 and the indication of the core network's 7 capability to support the extended DRX feature. The RAN-B also stores the time of sending the Attach/RAU/TAU accept message to the mobile telephone 3 as the TSFb parameter to be used by the network.

From the received Attach/RAU/TAU accept message, which includes the Extended DRX feature support indicator, the mobile telephone 3 can determine that the core network 7 also supports the extended DRX feature. Therefore, it stores the reception time of the Attach/RAU/TAU accept message as the TSBb parameter to be used for the extended DRX cycle, and then it calculates the STb and timing of active and dormant SFs as described above. In step S609, the RAN-B returns the TSFb parameter to the core network 7 in a response to the preceding setup message (e.g. in an 'Initial Setup Response' message in case of E-UTRAN). When the core network 7 receives the response to the setup message, it stores the TSFb parameter (and discards the previously stored provisional TSFb parameter).

However, if the core network 7 does not receive the TSFb time information (e.g. because the current RAN does not support the extended DRX feature), the core network 7 will use the provisionally stored TSFb as the TSFb for this mobile telephone 3 and RAN. The remaining steps S613 to S617 of the second embodiment generally correspond to steps S513 to S517 of the first embodiment and hence their description is omitted.

Advantageously, in this embodiment the core network 7 can verify (using the request-response procedure at steps S605 and S609) which radio access networks support the extended DRX cycle functionality. Therefore, the core network 7 will be able to determine the expected scheduling of paging messages in each network and it does not have to repeat the paging request (sent at S613) if the paging messages are delayed for the duration of dormant SFs in a RAN supporting the extended DRX functionality. However, if the mobile telephone 3 does not respond to the paging request(s) within a predetermined time (e.g. due to unfavourable signal conditions or movement of the mobile telephone 3 preventing it from receiving them), the core network 7 can repeat the paging for this mobile telephone 3 (possibly over a larger geographical area, i.e. involving a larger number of base stations 5 than in case of the initial paging attempt).

Third Embodiment—Extended DRX Cycle without RAN Support

Figure 7:
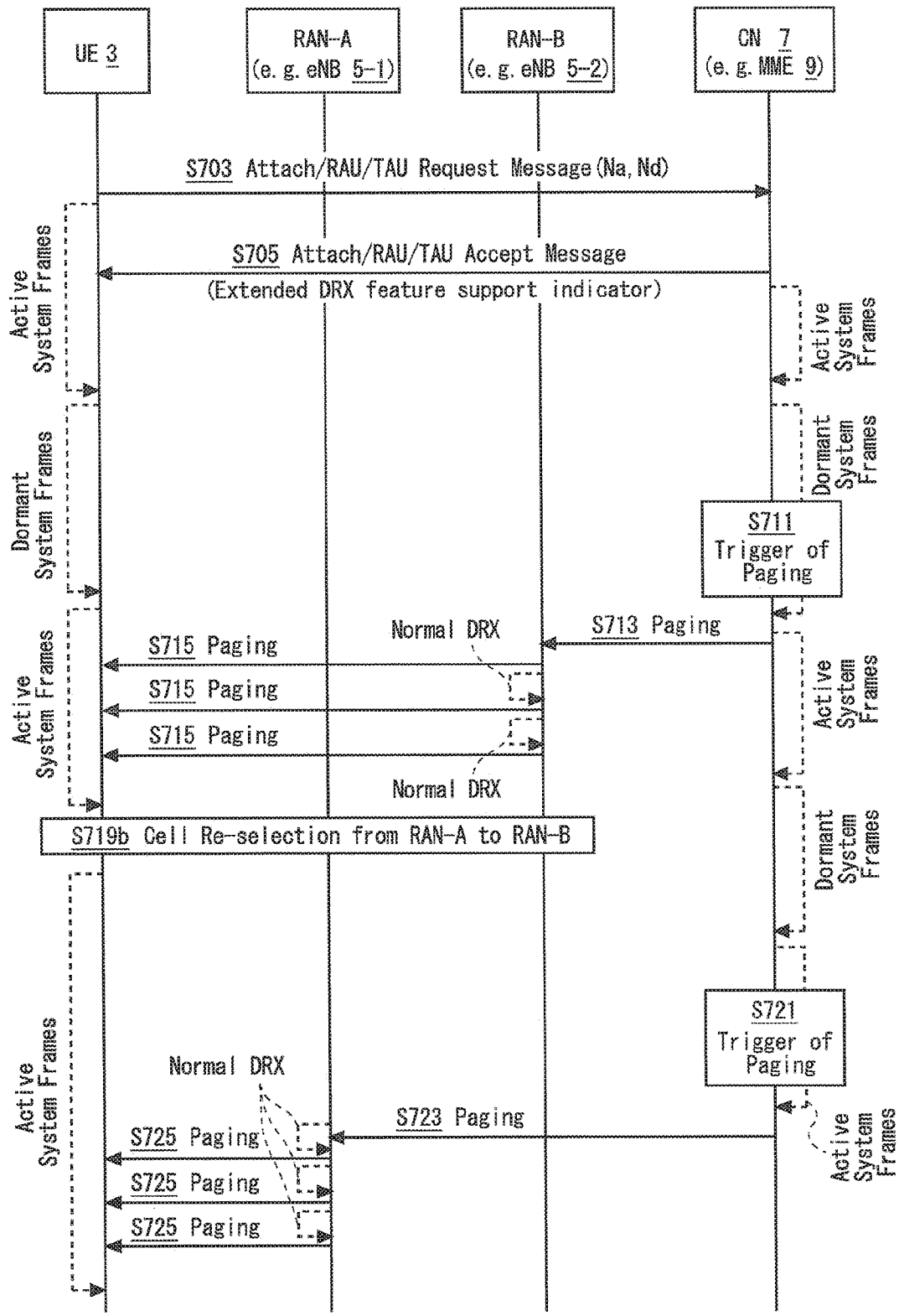
FIG. 7 shows an example timing diagram illustrating another method performed by components of the communication system when transmitting paging messages to a mobile telephone employing an extended DRX cycle.

FIG. 7 shows an example timing diagram illustrating another method performed by components of the communication system 1 when carrying out paging of a mobile telephone 3 configured with an extended DRX cycle. This embodiment generally follows the first embodiment, however, the core network 7 provides support for the extended DRX operation without involving the RAN(s).

In this example, the mobile telephone 3 initially registers its current location with a core network entity (e.g. the MME 9) by sending, at step S703, an appropriately formatted NAS message, as explained above with reference to step S503 of FIG. 5. The NAS message (which may comprise an Attach/RAU/TAU Request) includes the mobile telephone's 3 Na and Nd parameters (i.e. the number of active and dormant SFs in its extended DRX cycle) thereby informing the core network 7 about its capability for the extended DRX cycle functionality.

When an entity in the core network 7 (e.g. the MME 9) receives the message sent at S703 including the Na and Nd parameters, it stores these parameters as the UE specific values of the extended DRX feature for this mobile telephone 3.

Next, in step S705, the core network 7 generates and sends an appropriately formatted response (e.g. a NAS response such as an Attach/RAU/TAU accept message), and includes in this response information indicating that it supports the extended DRX feature (e.g. an extended DRX feature support indicator IE or flag). The core network 7 derives (as per FIG. 10b or FIG. 11a) the scheduling of active and dormant SFs using the time of sending this response (i.e. S705: Attach/RAU/TAU accept message) as the STb.

When the mobile telephone 3 receives the response with the extended DRX feature support indicator (at S705), it also schedules the active and dormant SFs for the current RAN and performs the extended DRX procedure accordingly. However, the mobile telephone 3 also schedules extra active SFs as described in detail with reference to FIG. 11c below.

When the core network 7 detects (at S711) a trigger for paging this mobile telephone 3 (and it determines that the current SF is a dormant SF for this mobile telephone 3), it waits until the next active SF before sending the paging request, in step S713, to the RAN serving the mobile telephone 3.

Since in this embodiment the RAN is not required to be aware of the extended DRX feature in use, it simply sends the prescribed number of paging messages to the mobile telephone 3, according to the normal DRX procedures, as generally shown at step S715. Since the core network 7 does not request the RAN to carry out paging for the mobile telephone 3 during any dormant SFs (only during active SFs), successful receipt of the paging messages by the mobile telephone 3 can be ensured.

When the mobile telephone 3 subsequently selects a new RAN to camp on (e.g. RAN-A instead of RAN-B), as generally shown at step S719, it maintains its current scheduling of active and dormant SFs (that was based on the time of sending the NAS message at S703). Even though the core network 7 is not aware of the cell re-selection by the mobile telephone 3, since the scheduling of active and dormant SFs is not changed, any further paging messages can be delivered to this mobile telephone 3 in the same manner as before assuming that the core network 7 requests paging of the mobile telephone 3 via each RAN under its control. As illustrated in steps S721 to S725, after re-selection, the mobile telephone 3 receives the paging messages via its new RAN-A.

Fourth Embodiment—Using Sequential System Frame Cycle Index

Figure 8:
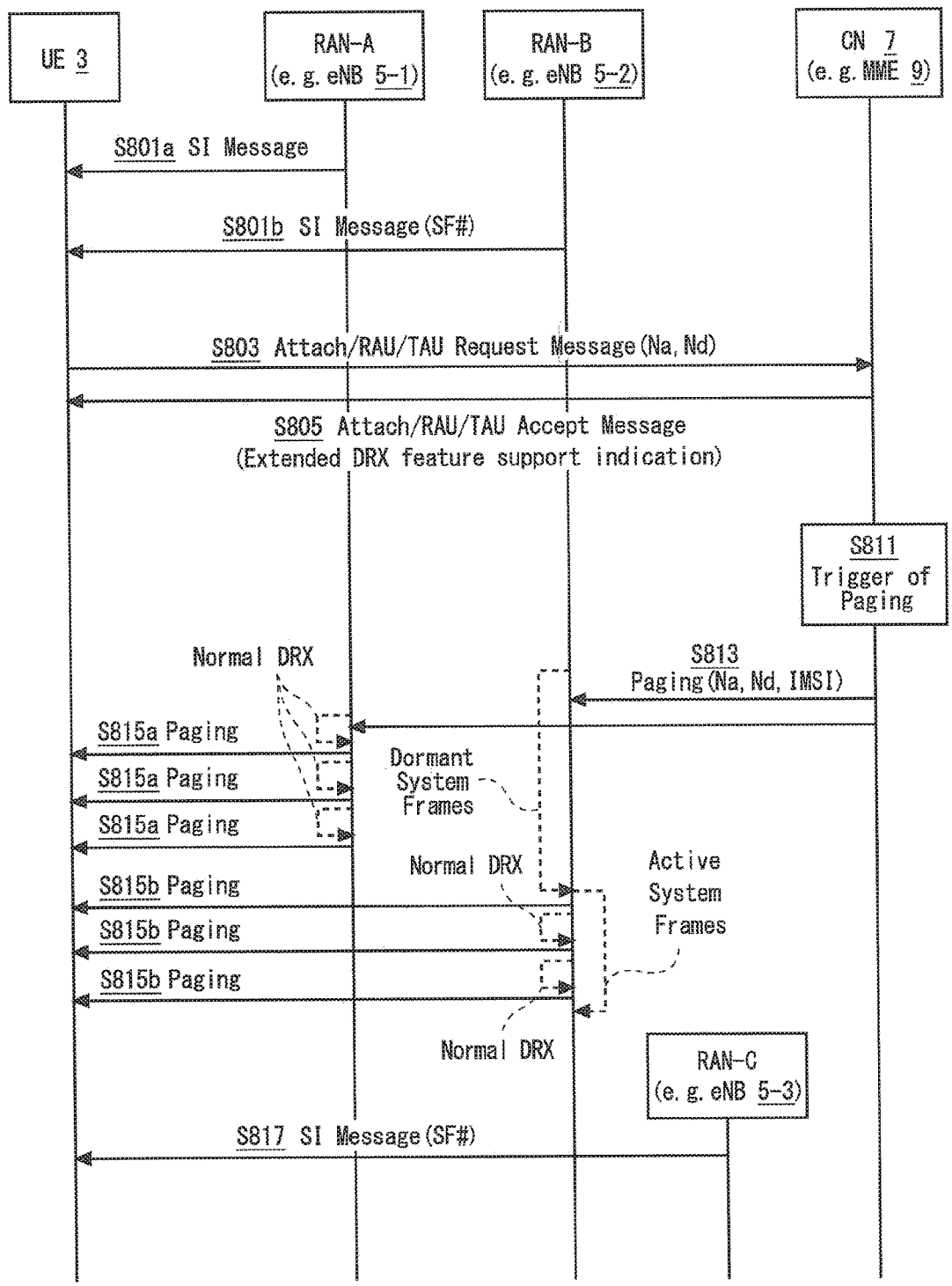
FIG. 8 shows an example timing diagram illustrating yet another method performed by components of the communication system when transmitting paging messages to a mobile telephone employing an extended DRX cycle.

FIG. 8 shows an example timing diagram illustrating another method performed by components of the communication system 1 when carrying out paging of a mobile telephone 3 configured with an extended DRX cycle. This embodiment generally follows the first embodiment, however, a sequential system frame number is used to synchronise the extended DRX operation between the RAN and the mobile telephone 3 instead of the RAN specific current time information.

In this embodiment, steps S801a to S811 and step S817 generally correspond to steps S501a to S511 and S517 of FIG. 5, respectively, thus detailed explanation of any identical features will be omitted. In this example, however, RAN-B which supports the extended DRX cycle functionality transmits (e.g. as part of the SI broadcast message at S801b) a sequential number identifying the current SF (SF#) rather than an explicit indicator of its compatibility with the extended DRX cycle feature and current time information (as in step S501b). This SF number informs the mobile telephone 3 that RAN-B is compatible with extended DRX cycles. As can be seen, RAN-B which does not support the extended DRX cycle feature does not include SF# in its SI broadcast message (S801a).

Upon receipt of the NAS message (at S803) which includes the Na/Nd value for the mobile telephone 3, the core network 7 derives the scheduling of active and dormant SFs according to the procedures described with reference to FIG. 10c.

In response to this, in step S805, the core network 7 provides an indication of its compatibility with the extended DRX feature (e.g. extended DRX feature support indicator) using an appropriately formatted NAS response (e.g. an Attach/RAU/TAU accept message) sent to the mobile telephone 3.

Upon receipt of a paging request from the core network 7 (at S813) which includes the Na, Nd parameters and an identification of the mobile telephone 3, such as an IMSI, each RAN performs paging of the mobile telephone 3 according to its DRX capability.

Thus RAN-A (which does not support the extended DRX feature) sends the prescribed number of paging messages to the mobile telephone 3 according to the normal DRX procedures (in radio frames during which the mobile telephone's 3 transceiver 31 is assumed to be active).

However, if RAN-B (which supports the extended DRX feature) receives the paging request from the core network 7 during a dormant SF, it postpones sending of any paging messages until the next active SF for this mobile telephone 3. Of course, if RAN-B receives the paging request from the core network 7 during an active SF, it sends the prescribed number of paging messages to the mobile telephone 3 without additional delay (according to the normal DRX procedures).

Figure 12A:
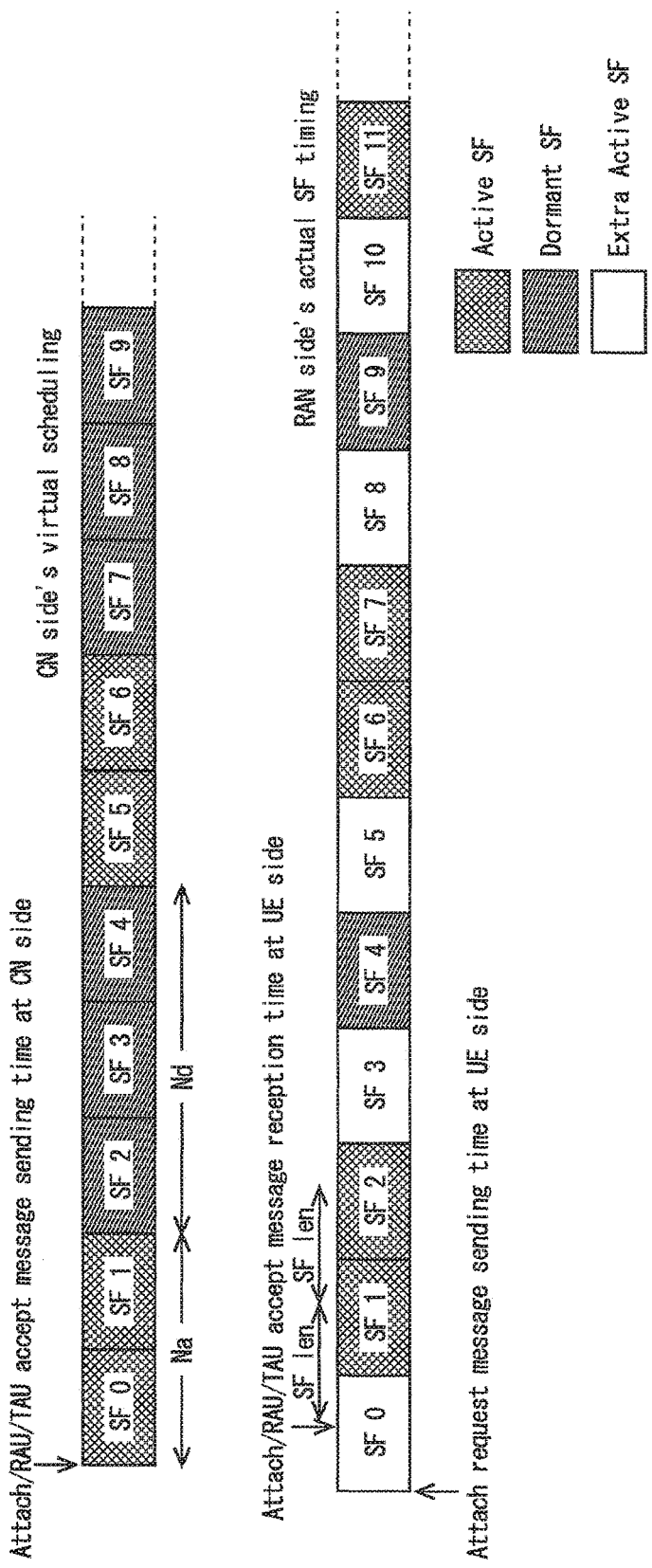
FIG. 12A illustrates additional details of the exemplary method of FIG. 8.

FIG. 12a (which is described in detail below) illustrates further details of this embodiment.

Configuring an Extended DRX Cycle Using an OMA DM Server

Figure 9:
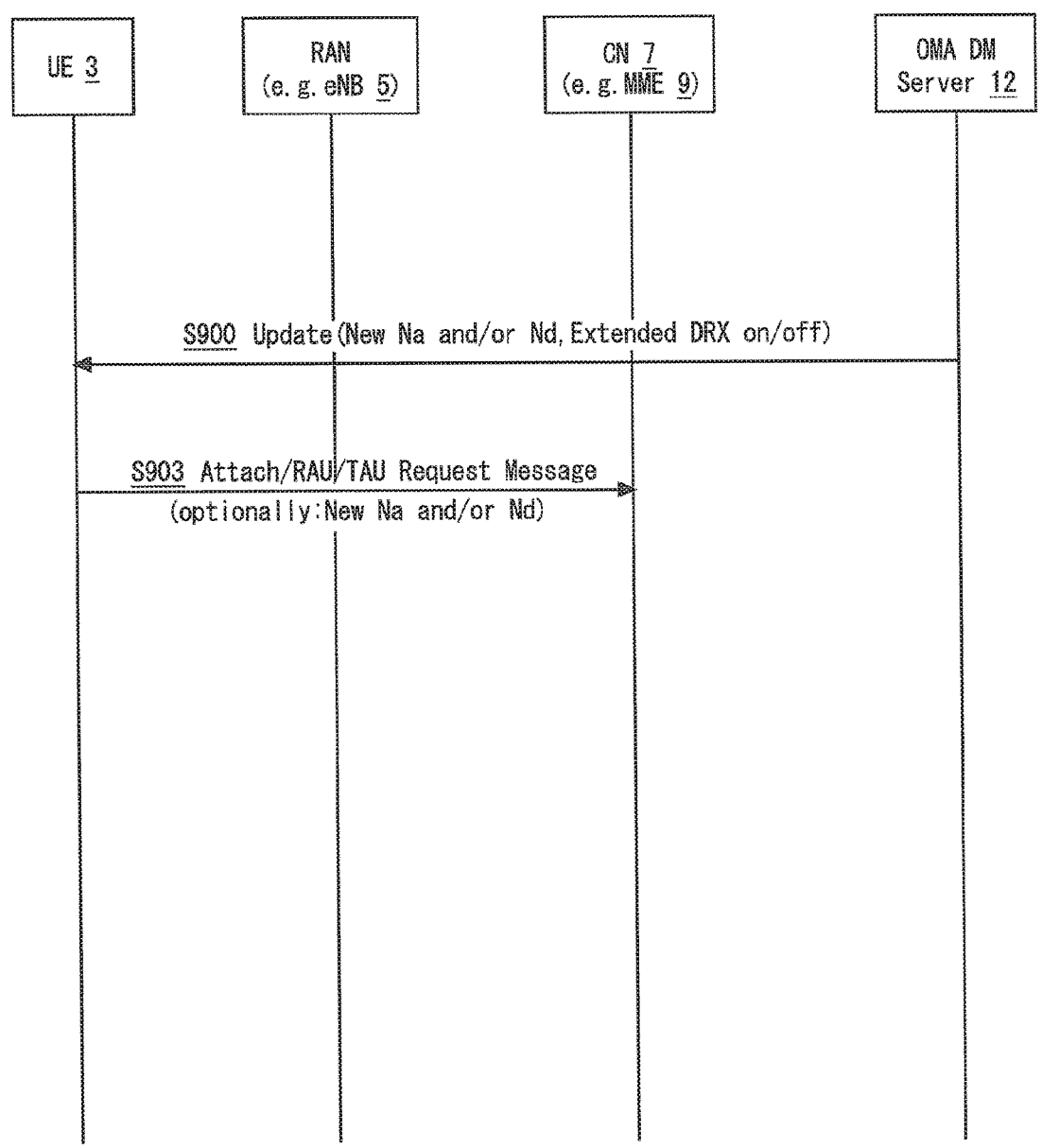
FIG. 9 shows an example timing diagram illustrating a method performed by components of the communication system when configuring an extended DRX cycle for a mobile telephone forming part of the system shown in FIG. 1.

FIG. 9 illustrates a possible way of configuring the parameters related to the extended DRX cycle for a mobile telephone 3. In this example, as shown in step S900, an OMA DM server entity 12 is used to update (by communicating with the OMA DM module 47) the DRX configuration stored in the memory 39 of the mobile telephone 3. This step may be performed at any time, whenever a change in the mobile telephone's 3 extended DRX cycle configuration is needed.

When the extended DRX functionality is turned on and/or when updated parameters have been received by the mobile telephone 3, it can include the current (updated) DRX parameters in a subsequent NAS request (at S903) to inform the core network 7 about the change in the mobile telephone's 3 DRX configuration. Upon receipt of the message at S903 (which may generally correspond to either one of messages S503/S603/S703/S803 described above), the core network 7 (and possibly the RAN as well) updates its operation in accordance with the newly received configuration.

Accordingly, at least the following parameters can be configured for the mobile telephone 3:

Na;
Nd; and
Extended DRX feature on/off.

If the number of active/dormant SFs (i.e. Na/Nd) is updated via the OMA DM entity 12, the mobile telephone may advantageously notify the core network about its new Na and/or Nd by generating and sending an appropriately formatted NAS message, e.g. an Attach/RAU/TAU request message. This will in turn cause the core network 7 to also update the extended DRX functionality in place for this mobile telephone 3.

If the Extended DRX feature is switched off, the mobile telephone may advantageously notify the core network 7 about this by generating and sending an appropriately formatted NAS message, e.g. an Attach/RAU/TAU request message, without including the number of active/dormant SFs. This will in turn cause the core network 7 to also turn off the extended DRX functionality for this mobile telephone 3 (although normal, non-extended DRX functionality may still be used).

MODIFICATIONS AND ALTERNATIVES

Detailed embodiments have been described above. As those skilled in the art will appreciate, a number of modifications and alternatives can be made to the above embodiments whilst still benefiting from the inventions embodied therein.

FIG. 10a illustrates the general extended DRX cycle feature of the above embodiments applicable to the LTE frame structure for E-UTRAN.

In order to achieve a longer DRX cycle than the SF length, the one or more consecutive active SFs and the one or more consecutive dormant SFs are scheduled periodically. Within any dormant SFs, the mobile telephone is configured to turn off its receiver as the network does not send any paging messages to this mobile telephone during dormant SFs. Within active SFs, however, normal DRX scheduling methods defined in the current 3GPP specifications are applied.

Since the mobile telephone and the network need to share the same timing of active and dormant SFs, various methods for specifying the active SFs and the dormant SFs can be provided. As explained above, one possible method involves using a so-called base SF (referred to as SFb) as the starting SF for the periodic scheduling of the active SFs and dormant SFs. The SFb is specified by an absolute time (i.e. as an exact point in time). Another possible method includes assigning a sequential number (for example, from #0 to #1023) to each SF and informing this number from the RAN to the mobile telephone, for example as part of the periodic SI broadcast messages.

Advantageously, if the time of the SFb is decided and shared between the mobile telephone and the network, both the mobile telephone and the network are able to follow the same scheduling of active SFs and dormant SFs based on the number of active SFs (Na) and the number of dormant SFs (Nd) calculated from the SFb.

FIG. 10b illustrates an exemplary method for calculating the scheduling of active and dormant SFs in the case of E-UTRAN in accordance with the above described embodiments.

Figure 10C:
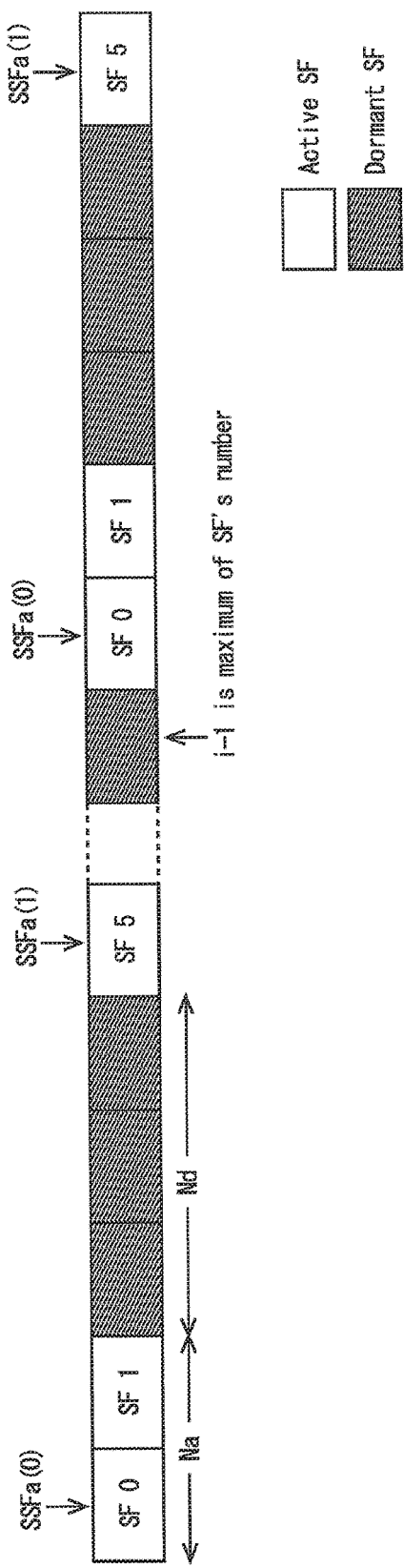
FIG. 10C illustrates another exemplary method for calculating scheduling of active and dormant system frames using sequential numbers assigned to each system frame.

FIG. 10c illustrates another exemplary method for calculating the scheduling of active and dormant SFs in which sequential numbers are assigned to each SF. In this case, the start of an active SF (SSFa) can be calculated using the following equation:

$$SSFa(x)=IMSI\ mod(Na+Nd)+(Na+Nd)*x; \text{ where}$$
$$SSFa(x)<i$$

In this case, the active SFs are located from SSFa(x) to SSFa(x)+Na−1 and the dormant SFs are located from SSFa(x)+Na to SSFa(x)+Nd−1.

FIG. 11a illustrates the calculation of STb by the mobile telephone using the current time and current SFN and the TSFb provided by the core network, in accordance with the above described embodiments.

Figure 11B:
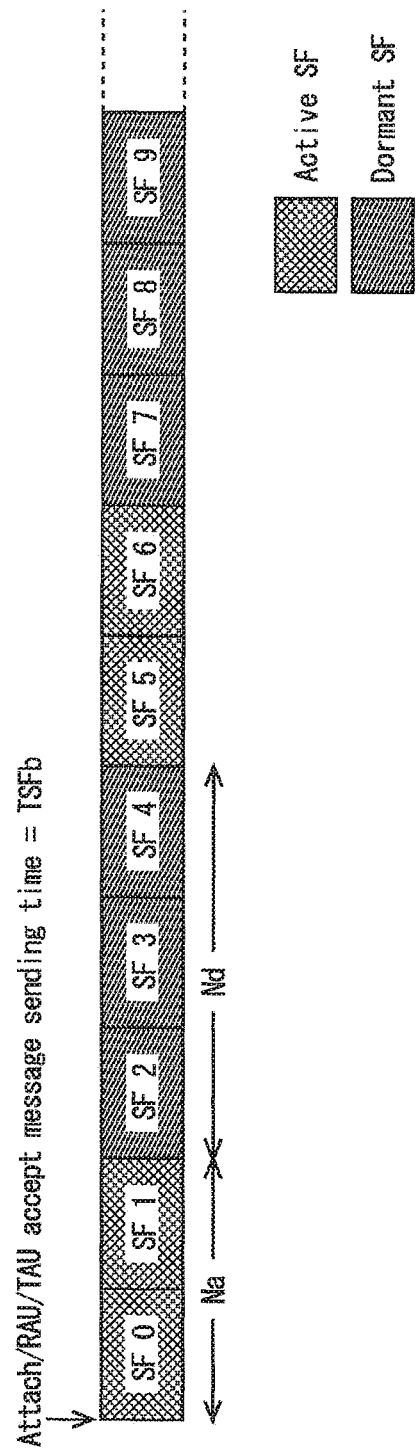
FIG. 11B illustrates an exemplary configuration of an extended DRX cycle according to the invention.

FIG. 11b illustrates an exemplary configuration of an extended DRX cycle in accordance with the above described embodiments. In this example, the value of Na is 2 and the value of Nd is 3. Thus SF numbers 0, 1, 5, 6 (and so on) are active SFs and the remaining system frames are dormant SFs.

Figure 11C:
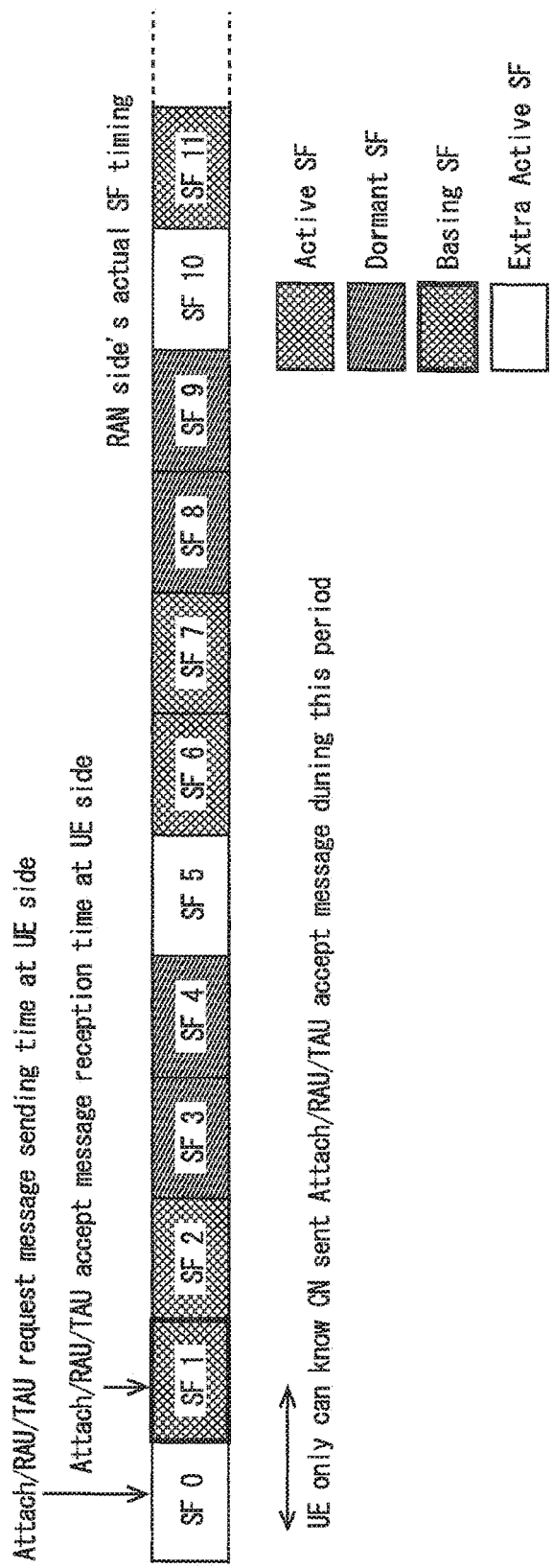
FIG. 11C illustrates a modification of the exemplary method of FIG. 6.

FIG. 11c illustrates a modification of the embodiment described with reference to FIG. 6. In this example, if the mobile telephone's current RAN does not support the extended DRX feature (such as RAN-A), the mobile telephone may use the time of sending the Attach/RAU/TAU request message (at step s603) to provide additional active SFs (referred to as 'extra active SFs') preceding the actual active SFs so that when the mobile telephone subsequently selects another RAN which supports extended DRX cycles (e.g. RAN-C) it will be able to receive paging messages without the need to re-register its location with the core network. This is made possible because (as described above with reference to FIG. 6) the core network stores the provisional TSFb for those RANs that do not support the extended DRX cycle (i.e. for RAN-A as well). Therefore, the core network (which is not yet aware that the mobile telephone is now camping on RAN-C instead of RAN-A) will expect delivery of paging messages earlier than the active SFs in current RAN-C—it can be seen in FIG. 6 that step S615a (RAN-A) takes place before step S615b (RAN-B and hence also RAN-C). The autonomous provision of 'extra active SFs' by the mobile telephone thus allows receipt of paging messages irrespective of the RAN that the mobile telephone currently camps on. In the particular example shown in FIG. 11c, the value of Na is 2 and the value of Nd is 3, as in case of FIG. 11b. In this case however SF numbers 0, 5, 10 (and so on) that are otherwise dormant SFs will act as additional (extra) active SFs when the mobile telephone camps on a new RAN that supports extended DRX cycles.

FIG. 12a illustrates further details of the exemplary fourth embodiment described above with reference to FIG. 8. In particular, FIG. 12a illustrates a possible way of scheduling active and dormant SFs by the mobile telephone.

Since in the fourth embodiment the RAN is not necessarily aware of the extended DRX cycle being in use (or it might not support such functionality at all) and the mobile telephone is not aware of the exact time of sending the Attach/RAU/TAU accept message, the mobile telephone is configured to schedule extra active SFs to compensate for the core network's possibly different scheduling of the active and dormant SFs (resulting from the different start time of each extended DRX cycle used by the core network and the mobile telephone).

Therefore, the mobile telephone schedules the active SFs by according to the following steps:

1. Any SFs overlapping with the time period between the mobile telephone sending the Attach/RAU/TAU request message and the mobile telephone receiving the Attach/RAU/TAU accept message (and any SFs corresponding to these SFs in each subsequent DRX cycle) are set as active SFs. In the example shown in FIG. 12a, these are SFs no. 0, 5, 10, etc.

2. Any SFs overlapping with the time period calculated as 'SF length×Na' from the receipt of the Attach/RAU/TAU accept message are also set as active SFs (groups of SFs). In the example shown in FIG. 12a, these are SFs no. 1 & 2, 6 & 7, 11 & 12, etc.

3. Any SFs immediately following the last active SF of the above groups of SFs are also set as active SFs. In this example, these are SFs no. 3, 8, 13, etc.

Step 3 ensures that the RAN (which is not aware of the extended DRX feature) is able to successfully deliver paging messages to the mobile telephone even if the core network entity requests paging only at the end of an actual active SF (since the core network's start time of the first extended DRX cycle is based on the time of sending the Attach/RAU/TAU accept message, which is later than the start time assumed by the mobile telephone, i.e. the time of sending the Attach/RAU/TAU request message).

Figure 12B:
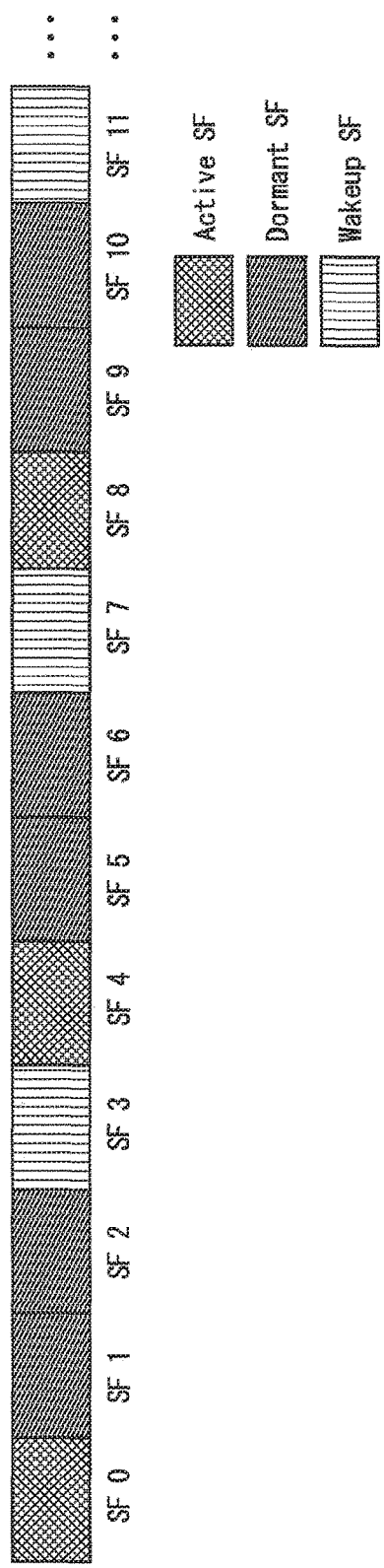
FIG. 12B illustrates a modified extended DRX cycle including wake-up system frames.

FIG. 12b illustrates a modified extended DRX cycle that allows the mobile telephone to monitor SI broadcast messages, which might carry important updates concerning the RAN(s) it currently camps on.

According to the current 3GPP specifications for UTRAN and E-UTRAN, when the radio access network changes (some of) its system information, it notifies the UEs about this change by sending a 'BCCH modification info' or a 'systemInfoModification' info via one or more paging messages. The details of this notification are described in section 8.1.1.7 of 3GPP TS25.331 and section 5.2.1.3 of 3GPP TS36.331, the contents of which are incorporated herein by reference.

Therefore, it is important for the mobile telephone to receive any SI updates without delay. However, if the extended DRX feature is active, the mobile telephone does not read the paging messages sent during any dormant SFs. Therefore, in some cases the mobile telephone cannot be notified of the system updates immediately if the network indicates such updates via paging messages.

In order to mitigate this problem, the last dormant SF of each extended DRX cycle may be defined as a so-called wakeup SF. Advantageously, the mobile telephone is able to read the necessary SI messages/updates during such wakeup SFs and read any paging messages in the next SF (which is an active SF).

According to a modification of this technique, wakeup SFs may also be used for carrying out signal measurements by the mobile telephone rather than for receiving paging/SI broadcast messages. In this case, the mobile telephone disables (i.e. by turning off its receiver) not only paging but cell measurement functionalities as well. However, in any wakeup SF, the mobile telephone may perform the necessary signal measurements and SI message reading, and if necessary, it may perform cell re-selection.

Various embodiments have been described in which the mobile telephone provides information about its DRX configuration to the core network by generating and sending a request upon connecting to the RAN. However, it will be appreciated that such information about the mobile telephone's DRX configuration might be provided to the core network periodically, even if the mobile telephone's serving RAN does not change. Further, it will also be appreciated that the information about the mobile telephone's DRX configuration might be provided to the core network upon (or immediately preceding) the mobile telephone's activation of the DRX functionality (e.g. upon receiving a new configuration from the OMA DM server or upon user input).

Although in FIG. 5 to FIG. 8 it is shown that the mobile telephone and the core network use the Attach/RAU/TAU requests and responses to exchange information relating to the extended DRX cycle. However, it will be appreciated that other messages may also be used, for example, a dedicated DRX configuration message or any existing NAS message in which the information relating to the extended DRX cycle can be included.

Although not shown in FIG. 5 to FIG. 8, if a RAN that supports the extended DRX feature is configured to send more than one paging messages, it might not be able to send all paging messages within the current active SF (or set of consecutive active SFs). In this case, it will be appreciated that the RAN might postpone the sending of any remaining paging messages until the next active SF (or set of consecutive active SFs).

In the above embodiments, the mobile telephone is described to activate its transceiver, in any active SFs, according to normal DRX scheduling methods defined in the current 3GPP specification for non-extended DRX cycles (i.e. DRX cycles that do not exceed the length of the system frame). However, it will also be appreciated that instead or employing a DRX cycle the mobile telephone may employ a different power saving method in active system frames. It will also be appreciated that instead of employing any power saving method, the mobile telephone may operate its receiver/transceiver for the whole duration of an active system frame and to turn off its transceiver only in dormant system frames.

In the above embodiments, the mobile telephone is described to switch off its receiver (and hence not listen for any paging messages) for the duration of each dormant SF. However, it will be also appreciated that, instead of turning off its receiver, the mobile telephone may employ a different DRX cycle (e.g. one having fewer active radio frames) than the DRX cycle it is using in active system frames or use a different power saving feature than the one it is using in active system frames (if any).

In the above embodiments, a mobile telephone based telecommunications system was described. As those skilled in the art will appreciate, the signalling techniques described in the present application can be employed in other communications systems. Other communications nodes or devices may include user devices such as, for example, personal digital assistants, laptop computers, web browsers, etc. As those skilled in the art will appreciate, it is not essential that the above described system be used for mobile communications devices. The system can be used in a network having one or more fixed computing devices as well as or instead of the mobile communicating devices.

In the above description, the base station and the mobile telephone are described, for ease of understanding, as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Whilst the signalling messages described herein that include the DRX configuration related information are advantageous in terms of simplicity, ease of implementation and minimising the number of messages required, this information may be sent in any of a number of different ways, e.g. in multiple messages. Moreover, instead of modifying the described signalling messages, completely new messages may be generated which include the measurement results.

In the embodiments described above, the mobile telephone and the base station will include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits. Various other modifications will be apparent to those skilled in the art and will not be described in further detail here.

SUMMARY

A brief summary of various features of the above embodiments is given below:

Active SF: during any active SF the UE is able to listen to paging messages. Any RAN node (i.e. base station/eNB) that supports the extended DRX feature is able to page the UE during active SFs as per the normal DRX scheduling methods defined in the current 3GPP specifications. This ensures that backwards compatibility can be maintained.

Dormant SF: During dormant SFs, the UE can conserve its battery power by switching off its receiver. The UE does not need to listen to paging messages during such dormant SFs since the network does not perform paging for this UE during any of the dormant SFs.

Wake-up SF: It is possible to use the last dormant SF of the extended DRX cycle as a Wake-up SF, allowing the UE to carry out reading of SI broadcast and measurements during such Wake-up SFs. This beneficially allows the UE to start listening to the paging messages as soon as it gets into the first active SF (of the next extended DRX cycle) without missing any network updates, especially if such updates are transmitted via paging messages during dormant SFs of the UE. This could be especially beneficial in e.g. a high mobility environment in which it would otherwise take relatively longer for the UE before it can start listening to paging messages.

Extended DRX feature support indication by RAN in the System Information: RAN can beneficially broadcast its Extended DRX feature support indicator in an SI message. The presence (or absence) of this indicator informs the UE whether or not the RAN node (i.e. eNodeB or RNC) supports the Extended DRX feature.

Extended DRX feature support indication from the core network in the Attach/RAU/TAU accept message: An entity in the core network (e.g. MME, SGSN, or MSC) is configured to include the extended DRX feature support indicator in the Attach/RAU/TAU accept message sent to the UE. This indicator informs the UE whether or not the core network supports the extended DRX feature.

Dormant SF and Active SF negotiation between the UE and the core network: The UE can request the extended DRX mode by sending to the core network the number (i.e. 1 to 'n') of active SFs and the number (i.e. 1 to 'm') of dormant SFs in an Attach/RAU/TAU update request or another suitable NAS message. The core network stores the numbers for dormant and active SFs (and possibly their pattern) as UE specific information to be used for the extended DRX feature.

Basing SF (SFb): This parameter specifies the starting SF for the periodic scheduling of the active and dormant SFs of a given extended DRX cycle. It may be defined as the time for SFb (in which case it is referred to as TSFb), e.g. as an absolute time in the format of YY-MM-DD HH:MM:SS.xx (e.g. with a minimum unit being 10 ms which is the length of one radio frame). The particular SF which includes the TSFb is regarded as the SFb. For example, the core network can define/set the TSFb to the time when it receives the Attach/RAU/TAU request message, to the time when it sends the corresponding Attach/RAU/TAU accept message, or to any past/future time.

Extended DRX configuration: An Extended DRX capable UE can be configured for a specific extended DRX cycle by the OMA DM using OTA or NAS signalling or using any configuration method suitable to inform the UE about the required number of dormant and active SFs in the extended DRX cycle.

Sequential numbering of the current SF broadcast in the System Information: If the RAN supports the extended DRX feature, it broadcasts the sequential number (i.e. 0 to 'n') of the current SF in an SI message. The RAN assigns a sequential number to each SF and the assigned number is broadcast in a SI message during each SF. Using this sequential number, the RAN and the UE can schedule the active and dormant SFs without having to define a starting SF.

The above-mentioned processing may be executed by a computer. Also, it is possible to provide a computer program which causes a programmable computer device to execute the above-mentioned processing. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM (Random Access Memory), etc.). The software modules may be provided to a computer using any type of transitory computer readable media. Examples of transitory computer readable media include electric signals, optical signals, and electromagnetic waves. Transitory computer readable media can provide the software modules to a computer via a wired communication line (e.g. electric wires, and optical fibers) or a wireless communication line.

This application is based upon and claims the benefit of priority from United Kingdom Patent Application No. 1308572.5, filed on May 13, 2013, the disclosure of which is incorporated herein in its entirely by reference.

REFERENCE SIGNS LIST

1 MOBILE TELECOMMUNICATION SYSTEM
3 MOBILE TELEPHONE
5 BASE STATION
7 CORE NETWORK
9 MOBILITY MANAGEMENT ENTITY (MME)
11 HOME SUBSCRIBER SERVER (HSS)
12 OPEN MOBILE ALLIANCE (OMA) DEVICE MANAGEMENT (DM) SERVER
13 FRAME
15 SUB-FRAME
17 SLOT
19 OFDM SYMBOL
21 PRB
31 TRANSCEIVER CIRCUIT
33 ANTENNA
35 USER INTERFACE
37 CONTROLLER
39 MEMORY
41 OPERATING SYSTEM
43 COMMUNICATIONS CONTROL MODULE
45 DISCONTINUOUS RECEPTION MODULE
47 OPEN MOBILE ALLIANCE DEVICE MANAGEMENT MODULE
51 TRANSCEIVER CIRCUIT
53 ANTENNA
55 NETWORK INTERFACE
57 CONTROLLER
59 MEMORY
61 OPERATING SYSTEM
63 COMMUNICATIONS CONTROL MODULE
65 DISCONTINUOUS TRANSMISSION MODULE
67 PAGING MODULE

The invention claimed is:

1. User equipment (UE) for communicating with a communication system, the UE comprising:
a transceiver configured to receive, from a core network entity of the communication system, at least one of an Attach Accept and a Routing Area Update (RAU) Accept message; and
a processor configured to synchronize an extended Discontinuous Reception (DRX) cycle to a time of receipt, by the transceiver, of the Attach Accept or the RAU Accept message, wherein
the transceiver configured to receive system information that include the number of active and the number of dormant System Frame (SF);
the transceiver configured to receive a paging message from Radio Access Network (RAN) that supports the extended DRX feature in the extended DRX cycle;
the transceiver configured to receive a paging message from Radio Access Network (RAN) that does not support the extended DRX feature in the non-extended DRX cycle.

2. The UE according to claim 1, wherein the received Attach Accept or RAU Accept message includes at least one extended DRX parameter, and wherein the processor is configured to determine a start of an extended DRX cycle based on the at least one extended DRX parameter such that the start of the extended DRX cycle is determined to coincide with the receipt, by the transceiver, of the Attach Accept or the RAU Accept message that includes the at least one extended DRX parameter.

3. The UE according to claim 2, wherein the transceiver is configured to send, to the core network entity, at least one of an Attach Request and a RAU request, and receive the Attach Accept or RAU Accept message including the at least one extended DRX parameter responsive to the sent Attach Request or RAU Request.

4. The UE according to claim 1, wherein the processor is configured to determine the start of an extended DRX cycle based on a reception time of the Attach Accept or RAU Accept message.

5. The UE according to claim 1, wherein the processor is configured to start the extended Discontinuous Reception (DRX) cycle upon receipt of the Attach Accept or the RAU Accept message.

6. The UE according to claim 2, wherein the processor is configured to control the transceiver to monitor for paging messages or system information messages in accordance with the extended DRX cycle in an idle mode.

7. The UE according to claim 4, wherein the processor is configured to control the transceiver to monitor for paging messages or system information messages in accordance with the extended DRX cycle in an idle mode.

8. The UE according to claim 1, wherein the transceiver is configured to provide to the core network entity information relating to a capability of the UE to communicate using extended DRX.

9. A core network entity for a communication system for communicating with a user equipment (UE), the core network entity comprising:
 a transceiver configured to send, to the UE, at least one of an Attach Accept and a Routing Area Update (RAU) Accept message; and
 a processor configured to synchronize an extended Discontinuous Reception (DRX) cycle to a time of sending the Attach Accept or the RAU Accept message, wherein the transceiver is configured to send the number of active and the number of dormant System Frames (SFs) to the UE and Radio Access Network (RAN).

10. The core network entity according to claim 9, wherein the Attach Accept or RAU Accept message includes at least one extended DRX parameter, and wherein the processor is configured to determine a start of an extended DRX cycle based on the at least one extended DRX parameter such that the start of the extended DRX cycle is determined to coincide with the sending, by the transceiver, of the Attach Accept or the RAU Accept message that includes the at least one extended DRX parameter.

11. The core network entity according to claim 10, wherein the transceiver is configured to receive, from the UE, at least one of an Attach Request and a RAU request, and send the Attach Accept or RAU Accept message including the at least one extended DRX parameter responsive to the received Attach Request or RAU Request.

12. The core network entity according to claim 9, wherein the processor is configured to control the transceiver to transmit, to the RAN, messages that enable the RAN to transmit to the UE paging messages or system information messages in accordance with an extended DRX cycle.

13. The core network entity according to claim 9, wherein the transceiver is configured to receive, from the UE, information relating to a capability of the UE to communicate using extended DRX.

14. A method performed by user equipment (UE) for communicating with a communication system, the method comprising:
 receiving, from a core network entity of the communication system, at least one of an Attach Accept and a Routing Area Update (RAU) Accept message;
 synchronizing an extended Discontinuous Reception (DRX) cycle to a time of receipt of the Attach Accept or the RAU Accept message;
 receiving system information that include the number of active and the number of dormant System Frames (SFs);
 receiving a paging message from Radio Access Network (RAN) that supports an extended DRX feature in the extended DRX cycle; and
 receiving a paging message from Radio Access Network (RAN) that does not support the extended DRX feature in the non-extended DRX cycle.

15. A method performed by a core network entity of a communication system, the method comprising:
 sending, to a user equipment (UE), at least one of an Attach Accept and a Routing Area Update (RAU) Accept message;
 synchronizing an extended Discontinuous Reception (DRX) cycle to a time of sending the Attach Accept or the RAU Accept message; and
 sending the number of active and the number of dormant System Frames (SFs) to the UE and a Radio Access Network (RAN).

16. A non-transitory computer-readable medium comprising computer implementable instructions that, when executed by a programmable communication device, the programmable communication device to perform a method according to claim 14.

17. A non-transitory computer-readable medium comprising computer implementable instructions that, when executed by a programmable communication device, the programmable communication device to perform a method according to claim 15.

* * * * *